(12) United States Patent
Tsai et al.

(10) Patent No.: US 9,304,304 B2
(45) Date of Patent: Apr. 5, 2016

(54) IMAGE CAPTURING LENS ASSEMBLY

(71) Applicant: LARGAN PRECISION CO., LTD., Taichung (TW)

(72) Inventors: Tsung-Han Tsai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 541 days.

(21) Appl. No.: 13/689,688

(22) Filed: Nov. 29, 2012

(65) Prior Publication Data

US 2014/0085712 A1  Mar. 27, 2014

(30) Foreign Application Priority Data

Sep. 26, 2012  (TW) .............................. 101135373 A

(51) Int. Cl.

| G02B 13/18 | (2006.01) |
|---|---|
| G02B 9/34 | (2006.01) |
| G02B 15/16 | (2006.01) |
| G02B 3/04 | (2006.01) |
| G02B 13/00 | (2006.01) |

(52) U.S. Cl.
CPC *G02B 15/16* (2013.01); *G02B 3/04* (2013.01); *G02B 9/34* (2013.01); *G02B 13/004* (2013.01)

(58) Field of Classification Search
CPC .............. G02B 9/00; G02B 9/34; G02B 9/56; G02B 13/00; G02B 13/001; G02B 13/0015; G02B 13/002; G02B 13/004; G02B 13/008

USPC .................................. 359/715, 754, 771, 783
See application file for complete search history.

(56) References Cited

U.S. PATENT DOCUMENTS

| 8,081,393 | B2 | 12/2011 | Chen et al. | |
|---|---|---|---|---|
| 8,089,698 | B1 * | 1/2012 | Tang et al. | ..................... 359/644 |
| 8,189,272 | B1 * | 5/2012 | Huang | ................. G02B 13/004 |
| | | | | 359/715 |
| 2007/0279761 | A1 | 12/2007 | Yamamoto | |
| 2012/0154905 | A1 * | 6/2012 | Tsai | ............................. 359/357 |
| 2013/0278714 | A1 | 10/2013 | Hirose | |

FOREIGN PATENT DOCUMENTS

| CN | 202003075 U | | 10/2011 |
|---|---|---|---|
| JP | 9-61710 | * | 3/1997 |
| JP | 2004302057 A | | 10/2004 |
| WO | 2012090729 A1 | | 7/2012 |

* cited by examiner

*Primary Examiner* — Thong Nguyen
(74) *Attorney, Agent, or Firm* — CKC & Partners Co., Ltd.

(57) ABSTRACT

An image capturing lens assembly includes, in order from an object side to an image side, a first lens element, a second lens element, a third lens element and a fourth lens element. The first lens element with negative refractive power has an object-side surface being convex and an image-side surface being concave. The second lens element with positive refractive power has an object-side surface and an image-side surface being both convex. The third lens element with positive refractive power has an object-side surface being concave and an image-side surface being convex. The fourth lens element with positive refractive power has an object-side surface being convex, and an image-side surface being concave at a paraxial region and being convex at a peripheral region, wherein the surfaces of the fourth lens element are aspheric.

30 Claims, 21 Drawing Sheets

IMAGE CAPTURING LENS ASSEMBLY

RELATED APPLICATIONS

The application claims priority to Taiwan Application Serial Number 101135373, filed Sep. 26, 2012, which is herein incorporated by reference.

BACKGROUND

1. Technical Field

The present invention relates to an image capturing lens assembly. More particularly, the present invention relates to a compact image capturing lens assembly applicable to infrared photographing and electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable one disclosed in U.S. Pat. No. 8,081,393. Due to the advancement of the manufacturing technologies and the trend of the compact electronics, the reduced pixel size of the image sensors is now applicable in these optical lens systems. However, with the increasing demand for higher image quality, the conventional three-element lens structure cannot satisfy these requirements of the compact optical lens system.

Moreover, the motion capturing technology applied to smart televisions or games based on motion sensing is provided which expands the possible applications of the optical lens system. The most significant characteristic of the application is for capturing user movements by the infrared camera. Therefore, the demand of the compact optical lens system applicable to the infrared optics is increased, and when the optical lens system with wide angle functionalities can further expand the range of motion capturing.

By the foregoing statement, a need exists in the art for providing an optical lens system for use in a compact mobile electronic product which satisfies normal demands, such as wide angle, large aperture, high definition etc. and is applicable to infrared motion capturing.

SUMMARY

According to one aspect of the present disclosure, an image capturing lens assembly includes, in order from an object side to an image side, a first lens element, a second lens element, a third lens element and a fourth lens element. The first lens element with negative refractive power has an object-side surface being convex at a paraxial region and an image-side surface being concave at a paraxial region. The second lens element with positive refractive power has an object-side surface being convex at a paraxial region and an image-side surface being convex at a paraxial region. The third lens element with positive refractive power has an object-side surface being concave at a paraxial region and an image-side surface being convex at a paraxial region. The fourth lens element with positive refractive power has an object-side surface being convex at a paraxial region, and an image-side surface being concave at a paraxial region and being convex at a peripheral region, wherein the object-side surface and the image-side surface of the fourth lens element are aspheric. When a curvature radius of the object-side surface of the second lens element is R3, and a curvature radius of the image-side surface of the second lens element is R4, the following relationship is satisfied:

$$-0.52 < (R3+R4)/(R3-R4) < 1.0.$$

According to another aspect of the present disclosure, an image capturing lens assembly includes, in order from an object side to an image side, a first lens element, a second lens element, a third lens element and a fourth lens element. The first lens element with negative refractive power has an object-side surface being convex at a paraxial region and an image-side surface being concave at a paraxial region. The second lens element with positive refractive power has an object-side surface being convex at a paraxial region and an image-side surface being convex at a paraxial region. The third lens element with positive refractive power has an object-side surface being concave at a paraxial region and an image-side surface being convex at a paraxial region. The fourth lens element with positive refractive power has an object-side surface being convex, and an image-side surface being concave at a paraxial region and being convex at a peripheral region, wherein the object-side surface and the image-side surface of the fourth lens element are aspheric. The image capturing lens assembly is applied to wavelengths of light between 780 nm and 950 nm. When a curvature radius of the object-side surface of the second lens element is R3, and a curvature radius of the image-side surface of the second lens element is R4, the following relationship is satisfied:

$$-1.0 < (R3+R4)/(R3-R4) < 1.0.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
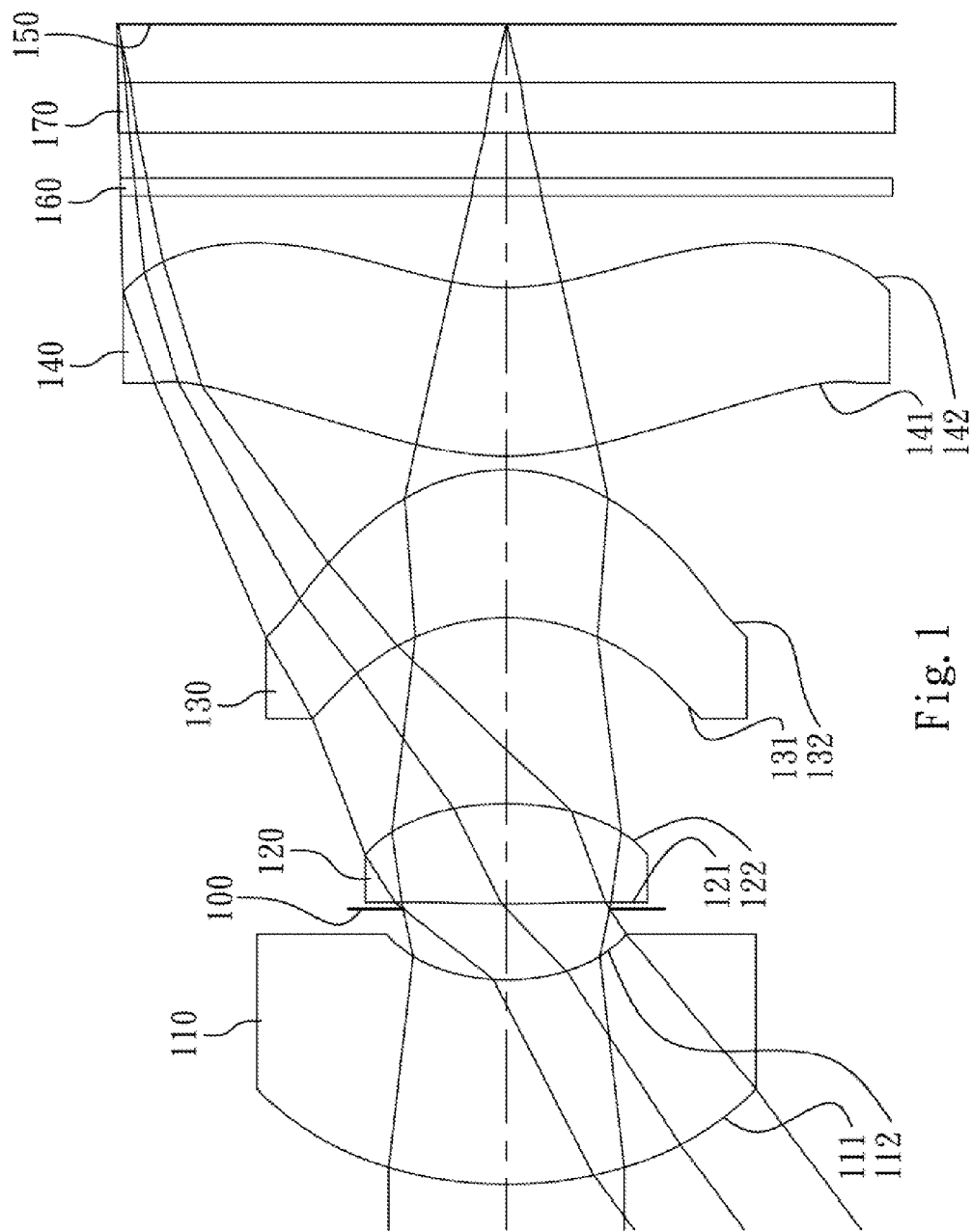
FIG. 1 is a schematic view of an image capturing lens assembly according to the 1st embodiment of the present disclosure.

An image capturing lens assembly includes, in order from an object side to an image side, a first lens element, a second lens element, a third lens element and a fourth lens element.

The image capturing lens assembly has the first lens element with negative refractive power, and has the second through fourth lens elements with positive refractive power, so that the image capturing lens assembly can obtain the retrofocus functionality. Therefore, the image capturing lens assembly can have proper back focal length for reducing the chief ray angle generated when the incident light projects onto an image sensor, and can obtain better sensor responses. Furthermore, the image capturing lens assembly with sufficient back focal length is proper for arranging filter elements or wavelength selectors so as to apply to the optical system with specific wavelengths, such as infrared.

The first lens element has an object-side surface being convex at a paraxial region and an image-side surface being concave at a paraxial region, so that a sufficient field of view can be obtained.

The second lens element has an object-side surface being convex at a paraxial region and an image-side surface being convex at a paraxial region, so that the positive refractive power of the second lens element can reduce the total track length of the image capturing lens assembly.

The third lens element has an object-side surface being concave at a paraxial region and an image-side surface being convex at a paraxial region, so that the astigmatism of the image capturing lens assembly can be corrected. Furthermore, a point on the optical axis projected from a position of a maximal effective diameter of the image-side surface of the third lens element is closer to the object side than an axial vertex of the object-side surface of the third lens element. Therefore, the functionality of the surface shape is significant for correcting the distortion generated by the first lens element with negative refractive power.

The fourth lens element has an object-side surface being convex at a paraxial region and being concave at a peripheral region, and has an image-side surface being concave at a paraxial region and being convex at a peripheral region. Therefore, the distribution of the positive refractive power of the image capturing lens assembly can be balanced and the retrofocus functionality can be enhanced, so that the image capturing lens assembly can have sufficient back focal length for effectively reducing the angle at which the incident light projects onto the image sensor from the off-axis field and correcting the aberration of the off-axis field.

When a curvature radius of the object-side surface of the second lens element is R3, and a curvature radius of the image-side surface of the second lens element is R4, the following relationship is satisfied:

$$-1.0<(R3+R4)/(R3-R4)<1.0.$$

Therefore, the surface curvature of the second lens element can be adjusted for properly distributing of the positive refractive power thereof, and the spherical aberration and the sensitivity of the image capturing lens assembly can be reduced.

R3 and R4 can further satisfy the following relationship:

$$-0.52<(R3+R4)/(R3-R4)<1.0.$$

Furthermore, R3 and R4 can satisfy the following relationship:

$$-0.30<(R3+R4)/(R3-R4)<1.0.$$

The image capturing lens assembly can further include a stop located between the first lens element and the second lens element. When an axial distance between the stop and the image-side surface of the fourth lens element is SD, and an axial distance between the object-side surface of the first lens element and the image-side surface of the fourth lens element is TD, the following relationship is satisfied:

$$0.63<SD/TD<0.83.$$

Therefore, the image capturing lens assembly can have a good balance between the telecentric and wide-angle functionalities, as well as a desirable total track length and sufficient field of view of the image capturing lens assembly.

When a curvature radius of the object-side surface of the third lens element is R5, and a curvature radius of the image-side surface of the third lens element is R6, the following relationship is satisfied:

$$|(R5-R6)/(R5+R6)|<0.1.$$

Therefore, the astigmatism of the image capturing lens assembly can be reduced by adjusting the surface curvature of the third lens element.

When an axial distance between the second lens element and the third lens element is T23, and a central thickness of the second lens element is CT2, the following relationship is satisfied:

$$1.5<T23/CT2<3.5.$$

Therefore, it is favorable for manufacturing and assembling of the lens elements and increasing the manufacture yield rate of the image capturing lens assembly by properly adjusting the thickness of the second lens element and the distance between the lens elements.

When a focal length of the first lens element is f1, a focal length of the third lens element is f3 and a focal length of the fourth lens element is f4, the following relationship is satisfied:

$$|f1/f3|+|f1/f4|<1.20.$$

Therefore, the image capturing lens assembly can obtain the retrofocus functionality, so that the image capturing lens assembly can have proper back focal length for reducing the chief ray angle which the incident light projects onto an image sensor, and can obtain better photosensitive response When the focal length of the first lens element is f1 a focal length of the second lens element is f2, the focal length of the third lens element is f3, and the focal length of the fourth lens element is f4, the following relationship is satisfied:

$$|f2/f1|+|f2/f3|+|f2/f4|<1.1.$$

By the proper arrangement of the refractive power of the lens elements, the retrofocus functionality can be enhanced, so that the image capturing lens assembly can have sufficient back focal length for arranging filter elements or wavelength selectors so as to apply to the optical system with specific wavelengths, such as infrared.

f1, f2, f3 and f4 can further satisfy the following relationship:

$$|f2/f1|+|f2/f3|+|f2/f4|<0.70.$$

When an axial distance between the second lens element and the third lens element is T23, and a central thickness of the third lens element is CT3, the following relationship is satisfied:

$$1.2<T23/CT3<4.0.$$

Therefore, it is favorable for manufacturing and assembling of the lens elements and increasing the manufacture yield rate of the image capturing lens assembly by properly adjusting the thickness of the third lens element and the distance between the lens elements.

When a focal length of the image capturing lens assembly is f, and a curvature radius of the image-side surface of the fourth lens element is R8, the following relationship is satisfied:

$$0.25R8/f<0.80.$$

Therefore, the high order aberration of the image capturing lens assembly can be corrected by properly adjusting the curvature of the image-side surface of the fourth lens element.

The image capturing lens assembly can be applied to the infrared wavelength between 780 nm and 950 nm. Therefore, the image capturing lens assembly can satisfy specific demands, such as photographing under specific wavelengths, detecting infrared images under low light environments or during motion capturing.

According to the image capturing lens assembly of the present disclosure, the lens elements thereof can be made of glass or plastic material. When the lens elements are made of glass material, the distribution of the refractive power of the image capturing lens assembly may be more flexible to design. When the lens elements are made of plastic material, the manufacturing costs can be effectively reduced. Furthermore, surfaces of each lens element can be aspheric, so that it is easier to make the surfaces into non-spherical shapes. As a result, more controllable variables are obtained, and the aberration as well as the number of required lens elements can be reduced while constructing an optical system. Therefore, the total track length of the image capturing lens assembly can also be reduced.

According to the image capturing lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the image capturing lens assembly of the present disclosure, the image capturing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the image capturing lens assembly of the present disclosure, a demand for applying to the optical system with moving focus or variable focus can be satisfied by the image capturing lens assembly with good correcting ability for the aberration and excessive image quality applicable to electronic image system, such as three dimensions image capturing, digital camera, mobile device, digital panel etc. Especially, the image capturing lens assembly can be applied to infrared wavelength, such as infrared camera etc.

According to the above description of the present disclosure, the following 1st-10th specific embodiments are provided for further explanation.

1st Embodiment

Figure 2:
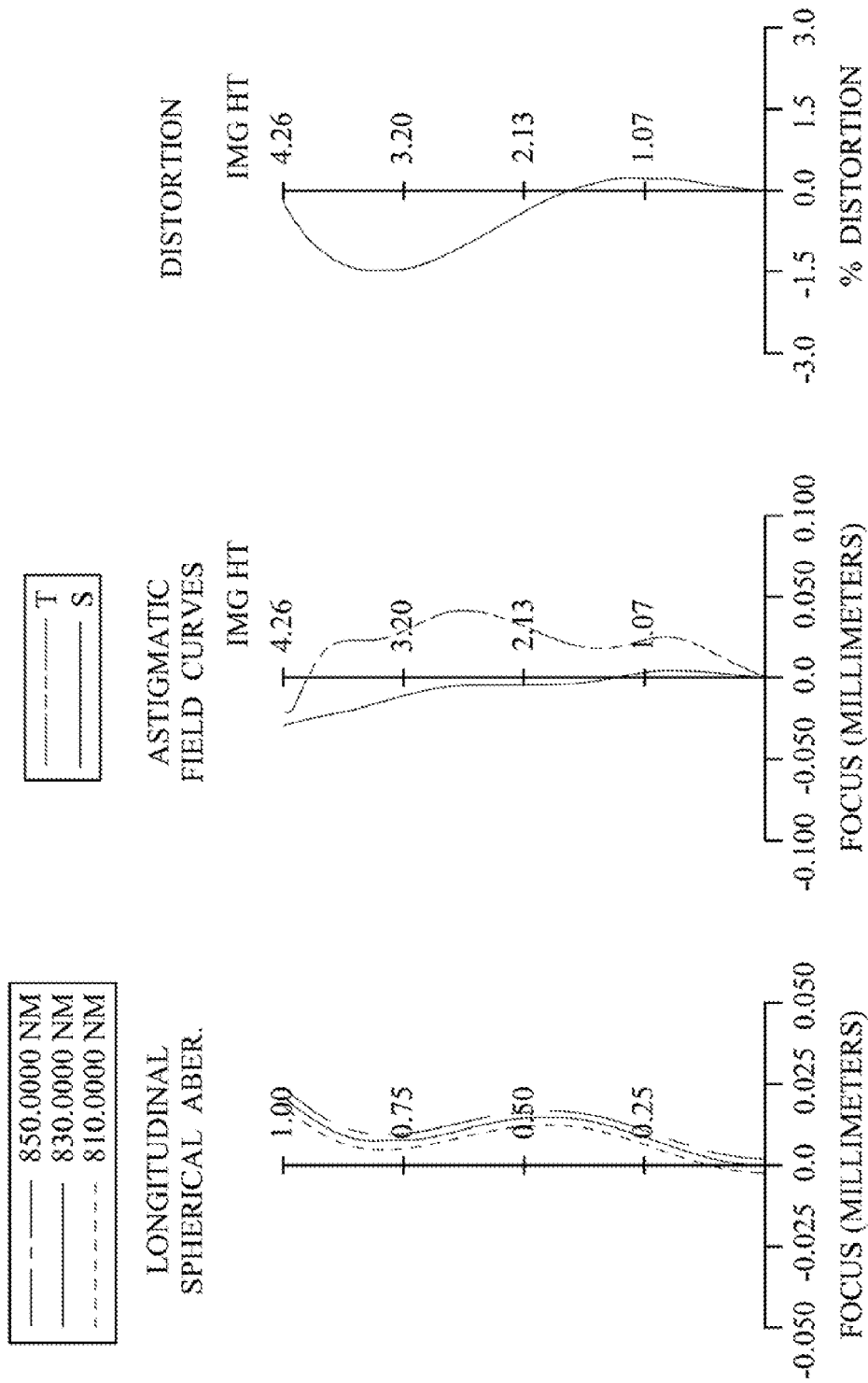
FIG. 2 shows spherical aberration curves, astigmatic field curves and a distortion curve of the image capturing lens assembly according to the 1st embodiment.

FIG. 1 is a schematic view of an image capturing lens assembly according to the 1st embodiment of the present disclosure. FIG. 2 shows spherical aberration curves, astigmatic field curves and a distortion curve of the image capturing lens assembly according to the 1st embodiment. In FIG. 1, the image capturing lens assembly includes, in order from an object side to an image side, a first lens element 110, an aperture stop 100, a second lens element 120, a third lens element 130, a fourth lens element 140, a filter 160, a cover glass 170 and an image plane 150.

The first lens element 110 with negative refractive power has an object-side surface 111 being convex at a paraxial region and an image-side surface 112 being concave at a paraxial region. The first lens element 110 is made of plastic material, such as TEIJIN SP3810, and has the object-side surface 111 and the image-side surface 112 both being aspheric.

The second lens element 120 with positive refractive power has an object-side surface 121 being convex at a paraxial region and an image-side surface 122 being convex at a paraxial region. The second lens element 120 is made of plastic material, such as APEL-5514ML, and has the object-side surface 121 and the image-side surface 122 both being aspheric.

Figure 21:
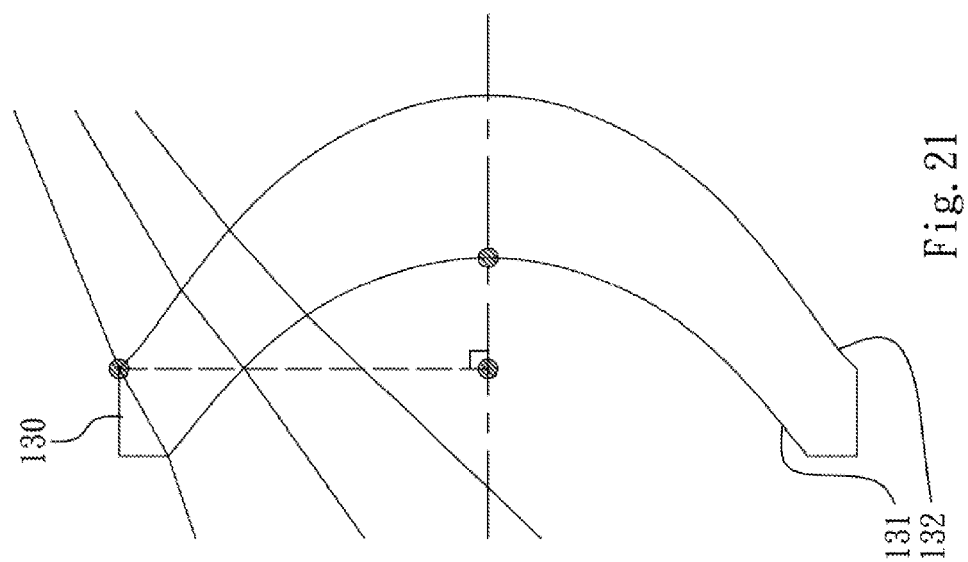
FIG. 21 is a schematic view of the surfaces of the third lens element in FIG. 1.

The third lens element 130 with positive refractive power has an object-side surface 131 being concave at a paraxial region and an image-side surface 132 being convex at a paraxial region. The third lens element 130 is made of plastic material, such as APEL-5514ML, and has the object-side surface 131 and the image-side surface 132 both being aspheric. Furthermore, FIG. 21 is a schematic view of the surfaces of the third lens element 130 of FIG. 1. In FIG. 21, a point on the optical axis projected from a position of a maximal effective diameter of the image-side surface 132 of the third lens element 130 is closer to the object side than an axial vertex of the object-side surface 131 of the third lens element 130.

The fourth lens element 140 with positive refractive power has an object-side surface 141 being convex at a paraxial region and being concave at a peripheral region, and has an image-side surface 142 being concave at a paraxial region and being convex at a peripheral region. The fourth lens element 140 is made of plastic material, such as APEL-5514ML, and has the object-side surface 141 and the image-side surface 142 both being aspheric.

The filter 160 and the cover glass 170 are located between the fourth lens element 140 and the image plane 150 in order, wherein the filter 160 and the cover glass 170 are made of glass material, such as HOYA BSC7, and will not affect the focal length of the image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,
- X is the relative distance between a point on the aspheric surface spaced at a distance Y from the optical axis and the tangential plane at the aspheric surface vertex on the optical axis;
- Y is the distance from the point on the curve of the aspheric surface to the optical axis;
- R is the curvature radius;
- k is the conic coefficient; and
- Ai is the i-th aspheric coefficient.

In the mage capturing lens assembly according to the 1st embodiment, when a focal length of the image capturing lens assembly is f, an f-number of the image lens assembly is Fno, and half of the maximal field of view of the image capturing lens assembly is HFOV, these parameters have the following values:

f=5.70 mm;
Fno=2.20; and
HFOV=36.8 degrees.

In the image capturing lens assembly according to the 1st embodiment, when an axial distance between the second lens element 120 and the third lens element 130 is T23, a central thickness of the second lens element 120 is CT2, and a central thickness of the third lens element is CT3, the following relationships are satisfied:

T23/CT2=1.87; and

T23/CT3=1.26.

In the image capturing lens assembly according to the 1st embodiment, when a curvature radius of the object-side surface 121 of the second lens element 120 is R3, a curvature radius of the image-side surface 122 of the second lens element 120 is R4, a curvature radius of the object-side surface 131 of the third lens element 130 is R5, and a curvature radius of the image-side surface 132 of the third lens element 130 is R6, the following relationships are satisfied:

(R3+R4)/(R3−R4)=0.71; and

|(R5−R6)/(R5+R6)|=0.07.

In the image capturing lens assembly according to the 1st embodiment, when the focal length of the image capturing lens assembly is f, and a curvature radius of the image-side surface 142 of the fourth lens element 140 is R8, the following relationship is satisfied:

R8/f=0.49.

In the image capturing lens assembly according to the 1st embodiment, when a focal length of the first lens element 110 is f1 a focal length of the second lens element 120 is f2, a focal length of the third lens element 130 is f3, and a focal length of the fourth lens element 140 is f4, the following relationships are satisfied:

|f2/f1|+|f2/f3|+|f2/f4|=0.96; and

|f1/f3|+|f1/f4|=1.24.

In the image capturing lens assembly according to the 1st embodiment, when an axial distance between the aperture stop 100 and the image-side surface 142 of the fourth lens element 140 is SD, and an axial distance between the object-side surface 111 of the first lens element 110 and the image-side surface 142 of the fourth lens element 140 is TD, the following relationship is satisfied:

SD/TD=0.69.

The image capturing lens assembly according to the 1st embodiment is applied to wavelengths of light between 780 nm and 950 nm.

The detailed optical data of the 1st embodiment are shown in Table 1 and the aspheric surface data are shown in Table 2 below.

TABLE 1

1st Embodiment
f = 5.70 mm, Fno = 2.20, HFOV = 36.8 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens 1 | 4.787 | (ASP) | 2.250 | Plastic | TEIJIN SP3810 | 1.620 | −12.44 |
| 2 | | 2.422 | (ASP) | 0.787 | | | | |
| 3 | Ape. Stop | Plano | | 0.056 | | | | |
| 4 | Lens 2 | 19.518 | (ASP) | 1.095 | Plastic | APEL-5514ML | 1.537 | 5.32 |
| 5 | | −3.284 | (ASP) | 2.053 | | | | |
| 6 | Lens 3 | −2.374 | (ASP) | 1.625 | Plastic | APEL-5514ML | 1.537 | 10.67 |
| 7 | | −2.080 | (ASP) | 0.150 | | | | |

TABLE 1-continued

1st Embodiment
f = 5.70 mm, Fno = 2.20, HFOV = 36.8 deg.

| Surface # | | Curvature Radius | | Thickness | Material | | Index | Focal length |
|---|---|---|---|---|---|---|---|---|
| 8 | Lens 4 | 3.310 | (ASP) | 1.862 | Plastic | APEL-5514ML | 1.537 | 160.51 |
| 9 | | 2.766 | (ASP) | 1.000 | | | | |
| 10 | Filter | Plano | | 0.200 | Glass | HOYA BSC7 | 1.510 | — |
| 11 | | Plano | | 0.500 | | | | |
| 12 | Cover glass | Plano | | 0.550 | Glass | HOYA BSC7 | 1.510 | — |
| 13 | | Plano | | 0.651 | | | | |
| 14 | Image | Plano | | — | | | | |

The image capturing lens assembly is applied to the infrared wavelength.
The focal length and the refractive index are calculated based on a wavelength of 830 nm.

TABLE 2

Aspheric Coefficients

| | Surface # | | | |
|---|---|---|---|---|
| | 1 | 2 | 4 | 5 |
| k = | −5.1293E−01 | 1.7158E+00 | −1.0000E+00 | 1.5869E+00 |
| A4 = | 3.2736E−03 | 6.8625E−03 | −5.7619E−03 | −7.0866E−03 |
| A6 = | 4.2519E−06 | −2.0189E−03 | −1.7170E−03 | −5.6768E−03 |
| A8 = | 2.6008E−05 | 1.7381E−03 | −3.1031E−04 | 3.7931E−03 |
| A10 = | −1.7024E−06 | −6.9232E−04 | −5.5426E−04 | −3.0459E−03 |
| A12 = | | | 2.4398E−05 | 1.1052E−03 |
| A14 = | | | | −1.9926E−04 |

| | Surface # | | | |
|---|---|---|---|---|
| | 6 | 7 | 8 | 9 |
| k = | −5.9492E+00 | −4.7117E−01 | −5.1039E+00 | −4.3777E+00 |
| A4 = | −3.6406E−02 | −7.2413E−04 | −5.8918E−03 | −1.1266E−02 |
| A6 = | 3.7333E−03 | 8.0319E−04 | 7.7470E−04 | 8.5723E−04 |
| A8 = | −9.0150E−04 | 4.2046E−05 | −5.4060E−05 | −4.6117E−05 |
| A10 = | 1.3929E−04 | −2.4475E−05 | 1.8446E−06 | 1.3037E−06 |
| A12 = | | 3.7993E−06 | −3.6489E−08 | −1.9837E−08 |
| A14 = | | 2.6231E−07 | | |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
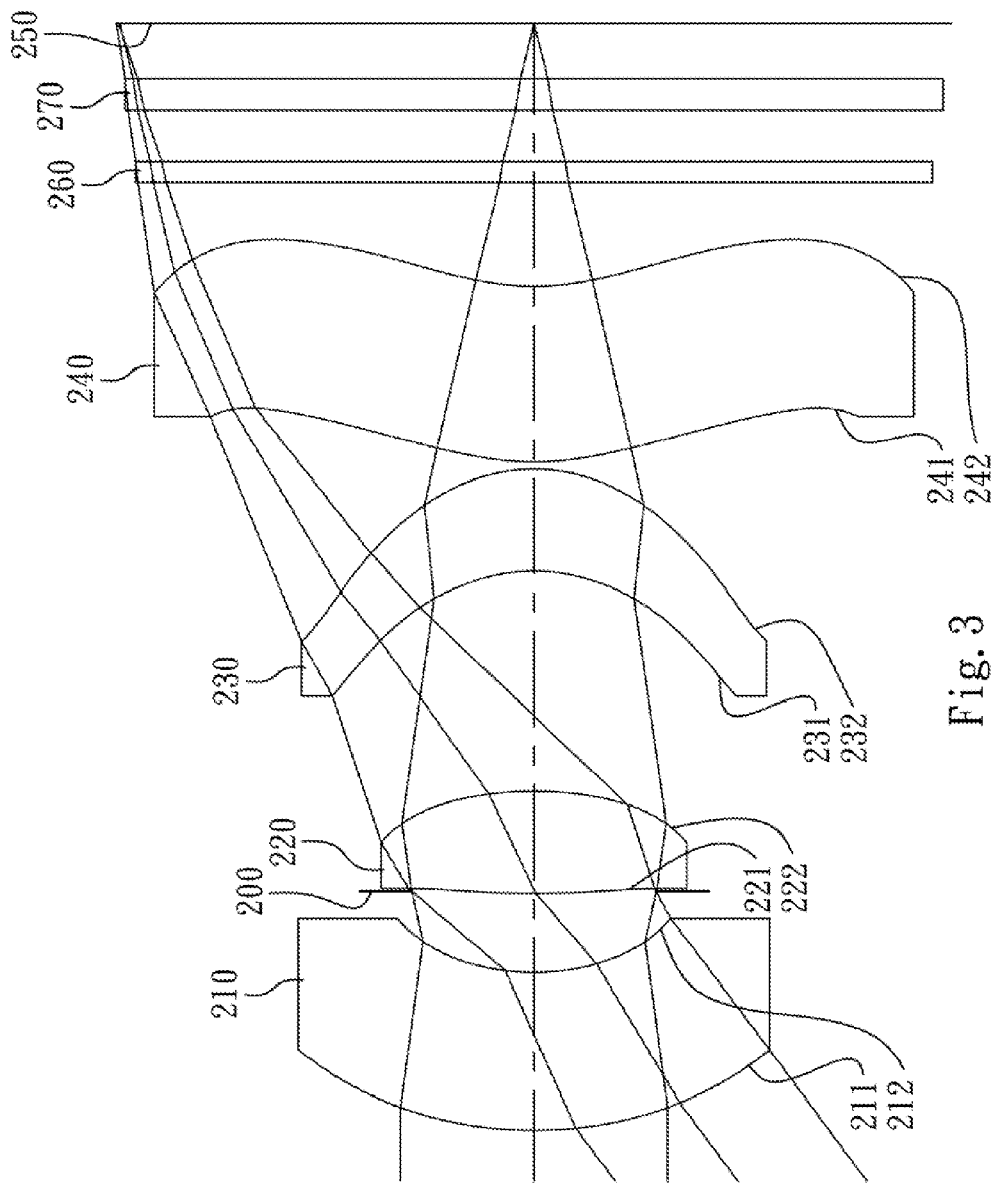
FIG. 3 is a schematic view of an image capturing lens assembly according to the 2nd embodiment of the present disclosure.
Figure 4:
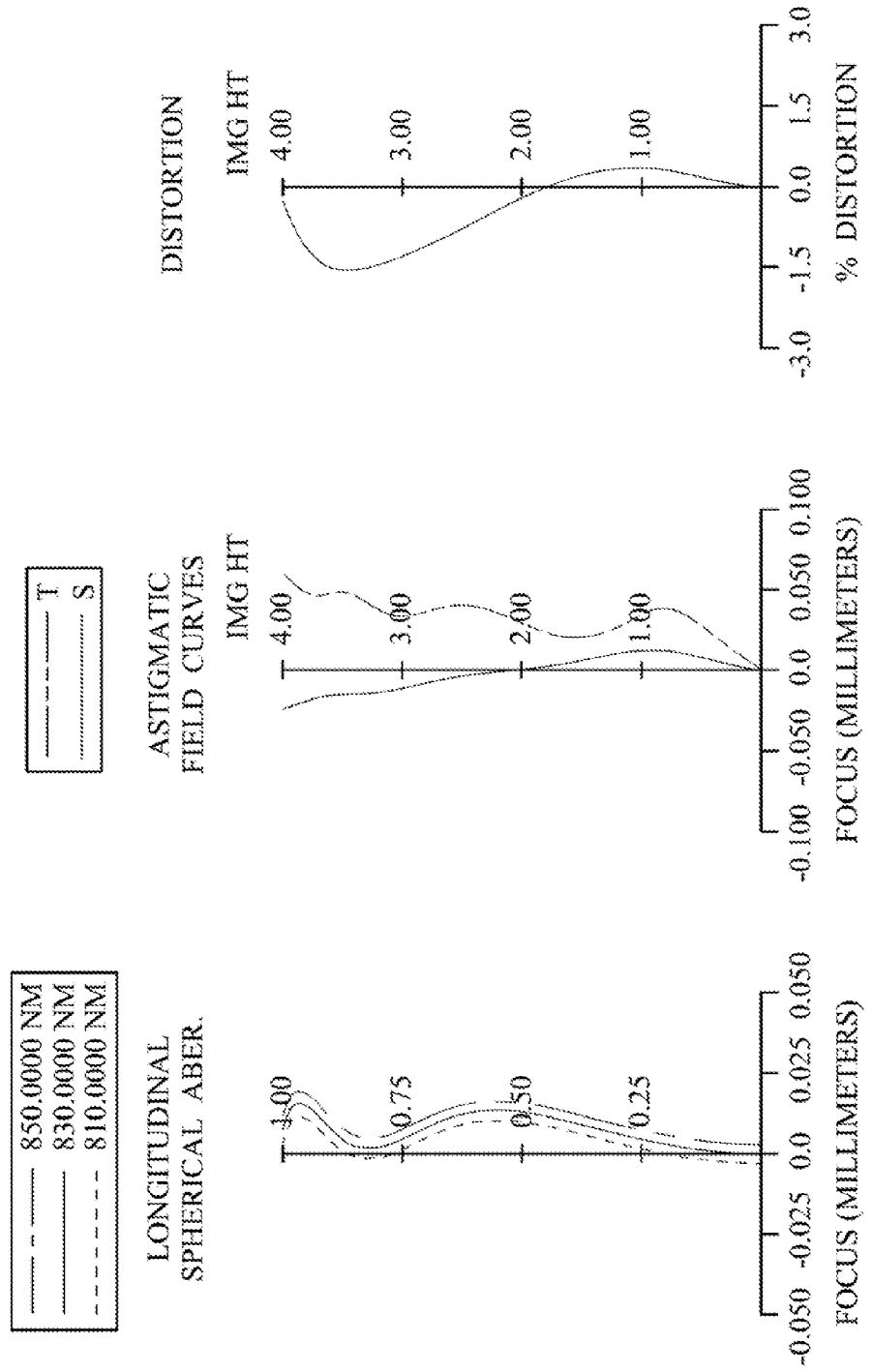
FIG. 4 shows spherical aberration curves, astigmatic field curves and a distortion curve of the image capturing lens assembly according to the 2nd embodiment.

FIG. 3 is a schematic view of an image capturing lens assembly according to the 2nd embodiment of the present disclosure. FIG. 4 shows spherical aberration curves, astigmatic field curves and a distortion curve of the image capturing lens assembly according to the 2nd embodiment. In FIG. 3, the image capturing lens assembly includes, in order from an object side to an image side, a first lens element 210, an aperture stop 200, a second lens element 220, a third lens element 230, a fourth lens element 240, a filter 260, a cover glass 270 and an image plane 250.

The first lens element 210 with negative refractive power has an object-side surface 211 being convex at a paraxial region and an image-side surface 212 being concave at a paraxial region. The first lens element 210 is made of plastic material, such as MGC EP5000, and has the object-side surface 211 and the image-side surface 212 both being aspheric.

The second lens element 220 with positive refractive power has an object-side surface 221 being convex at a paraxial region and an image-side surface 222 being convex at a paraxial region. The second lens element 220 is made of plastic material, such as ZEONEX F52R, and has the object-side surface 221 and the image-side surface 222 both being aspheric.

The third lens element 230 with positive refractive power has an object-side surface 231 being concave at a paraxial region and an image-side surface 232 being convex at a paraxial region. The third lens element 230 is made of plastic material, such as ZEONEX F52R, and has the object-side surface 231 and the image-side surface 232 both being aspheric. Furthermore, the point on the optical axis projected from a position of a maximal effective diameter of the image-side surface 232 of the third lens element 230 is closer to the object side than an axial vertex of the object-side surface 231 of the third lens element 230. (Please refer to FIG. 21, and will not provide another figure for the 2nd embodiment.)

The fourth lens element 240 with positive refractive power has an object-side surface 241 being convex at a paraxial region and being concave at a peripheral region, and has an image-side surface 242 being concave at a paraxial region and being convex at a peripheral region. The fourth lens element 240 is made of plastic material, such as ZEONEX F52R, and has the object-side surface 241 and the image-side surface 242 both being aspheric.

The filter 260 and the cover glass 270 are located between the fourth lens element 240 and the image plane 250 in order, wherein the filter 260 and the cover glass 270 are made of glass material, such as HOYA BSC7, and will not affect the focal length of the image capturing lens assembly.

The image capturing lens assembly according to the 2nd embodiment is applied to wavelengths of light between 780 nm and 950 nm.

The detailed optical data of the 2nd embodiment are shown in Table 3 and the aspheric surface data are shown in Table 4 below.

In the optical image system according to the 2nd embodiment, the definitions of f, Fno, HFOV, T23, CT2, CT3, R3, R4, R5, R6, R8, f1, f2, f3, f4, SD and TD are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 5.42 | |(R5 − R6)/(R5 + R6)| | 0.00 |
| Fno | 2.10 | R8/f | 0.45 |
| HFOV (deg.) | 36.5 | |f2/f1| + |f2/f3| + |f2/f4| | 0.81 |
| T23/CT2 | 2.16 | |f1/f3| + |f1/f4| | 1.15 |
| T23/CT3 | 2.16 | SD/TD | 0.72 |
| (R3 + R4)/(R3 − R4) | 0.47 | | |

TABLE 3

2nd Embodiment
f = 5.42 mm, Fno = 2.10, HFOV = 36.5 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens 1 | 4.140 | (ASP) | 1.523 | Plastic | MGC EP5000 | 1.616 | −13.30 |
| 2 | | 2.364 | (ASP) | 0.785 | | | | |
| 3 | Ape. Stop | Plano | | −0.019 | | | | |
| 4 | Lens 2 | 9.827 | (ASP) | 0.984 | Plastic | ZEONEX F52R | 1.527 | 5.03 |
| 5 | | −3.511 | (ASP) | 2.128 | | | | |
| 6 | Lens 3 | −1.688 | (ASP) | 0.985 | Plastic | ZEONEX F52R | 1.527 | 15.91 |
| 7 | | −1.688 | (ASP) | 0.070 | | | | |
| 8 | Lens 4 | 2.729 | (ASP) | 1.700 | Plastic | ZEONEX F52R | 1.527 | 42.74 |
| 9 | | 2.437 | (ASP) | 1.000 | | | | |
| 10 | Filter | Plano | | 0.200 | Glass | HOYA BSC7 | 1.510 | — |
| 11 | | Plano | | 0.500 | | | | |
| 12 | Cover glass | Plano | | 0.300 | Glass | HOYA BSC7 | 1.510 | — |
| 13 | | Plano | | 0.540 | | | | |
| 14 | Image | Plano | | — | | | | |

The image capturing lens assembly is applied to the infrared wavelength.
The focal length and the refractive index are calculated based on a wavelength of 830 nm.

TABLE 4

Aspheric Coefficients

| | Surface # | | | |
|---|---|---|---|---|
| | 1 | 2 | 4 | 5 |
| k = | −2.1755E−01 | 1.5353E+00 | −1.0000E+00 | 1.9497E+00 |
| A4 = | 4.2063E−03 | 8.9586E−03 | −3.0931E−03 | −9.7592E−03 |
| A6 = | −8.7155E−05 | −1.8907E−03 | −5.6549E−03 | −4.1956E−03 |
| A8 = | 8.0001E−05 | 1.9605E−03 | 3.2804E−03 | 1.9483E−03 |
| A10 = | −1.3728E−05 | −8.9824E−04 | −2.3622E−03 | −3.6222E−03 |
| A12 = | | | 2.4398E−05 | 2.0290E−03 |
| A14 = | | | | −5.1384E−04 |

| | Surface # | | | |
|---|---|---|---|---|
| | 6 | 7 | 8 | 9 |
| k = | −4.2564E+00 | −5.1048E−01 | −6.5909E+00 | −5.0115E+00 |
| A4 = | −4.8054E−02 | 2.9444E−04 | −8.3652E−03 | −1.3293E−02 |
| A6 = | 2.3420E−03 | 1.3089E−03 | 1.1282E−03 | 1.1751E−03 |
| A8 = | −1.0476E−03 | −1.0065E−04 | −8.0987E−05 | −6.6164E−05 |
| A10 = | 3.1868E−04 | −3.1898E−05 | 8.7147E−07 | 2.3315E−07 |
| A12 = | −3.0490E−13 | 1.9541E−05 | −8.5545E−08 | 3.7625E−08 |
| A14 = | | 2.3747E−06 | | |

3rd Embodiment

Figure 5:
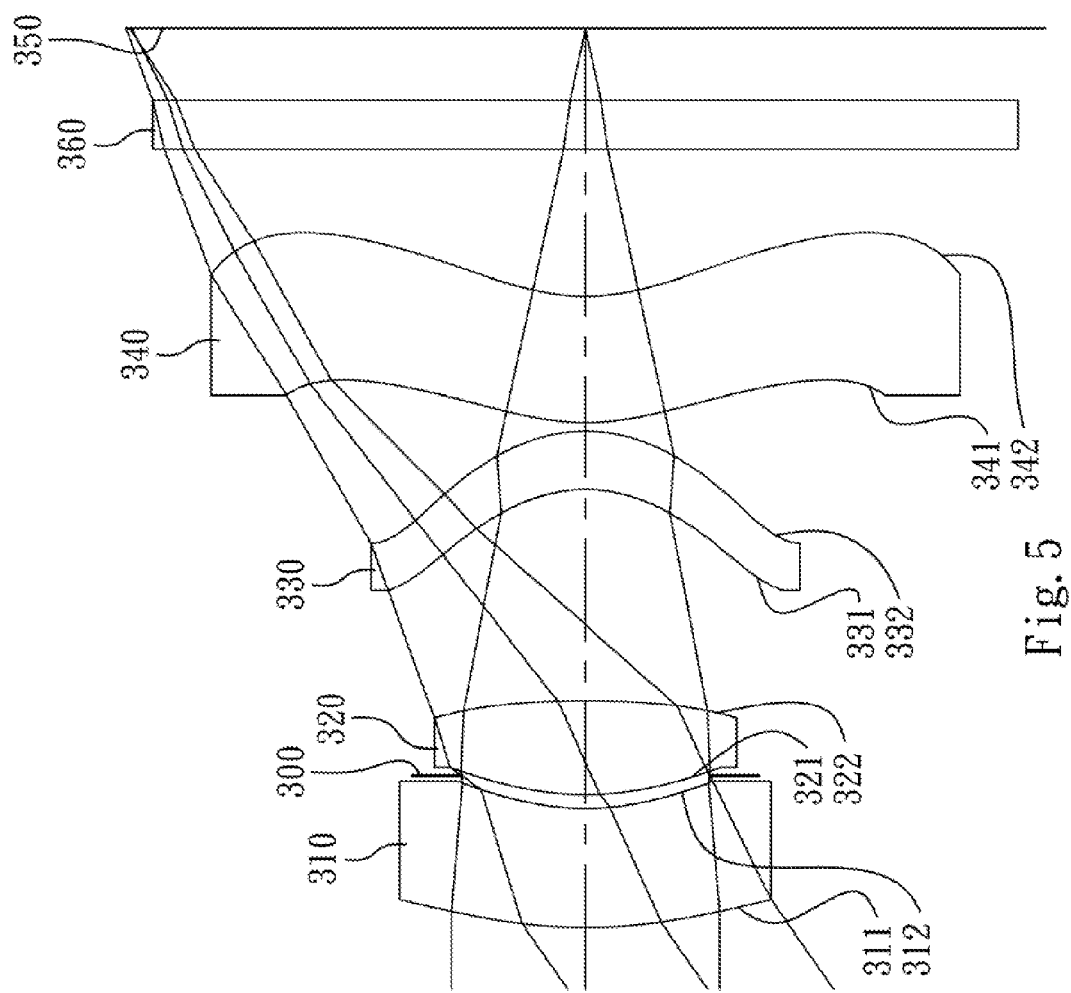
FIG. 5 is a schematic view of an image capturing lens assembly according to the 3rd embodiment of the present disclosure.
Figure 6:
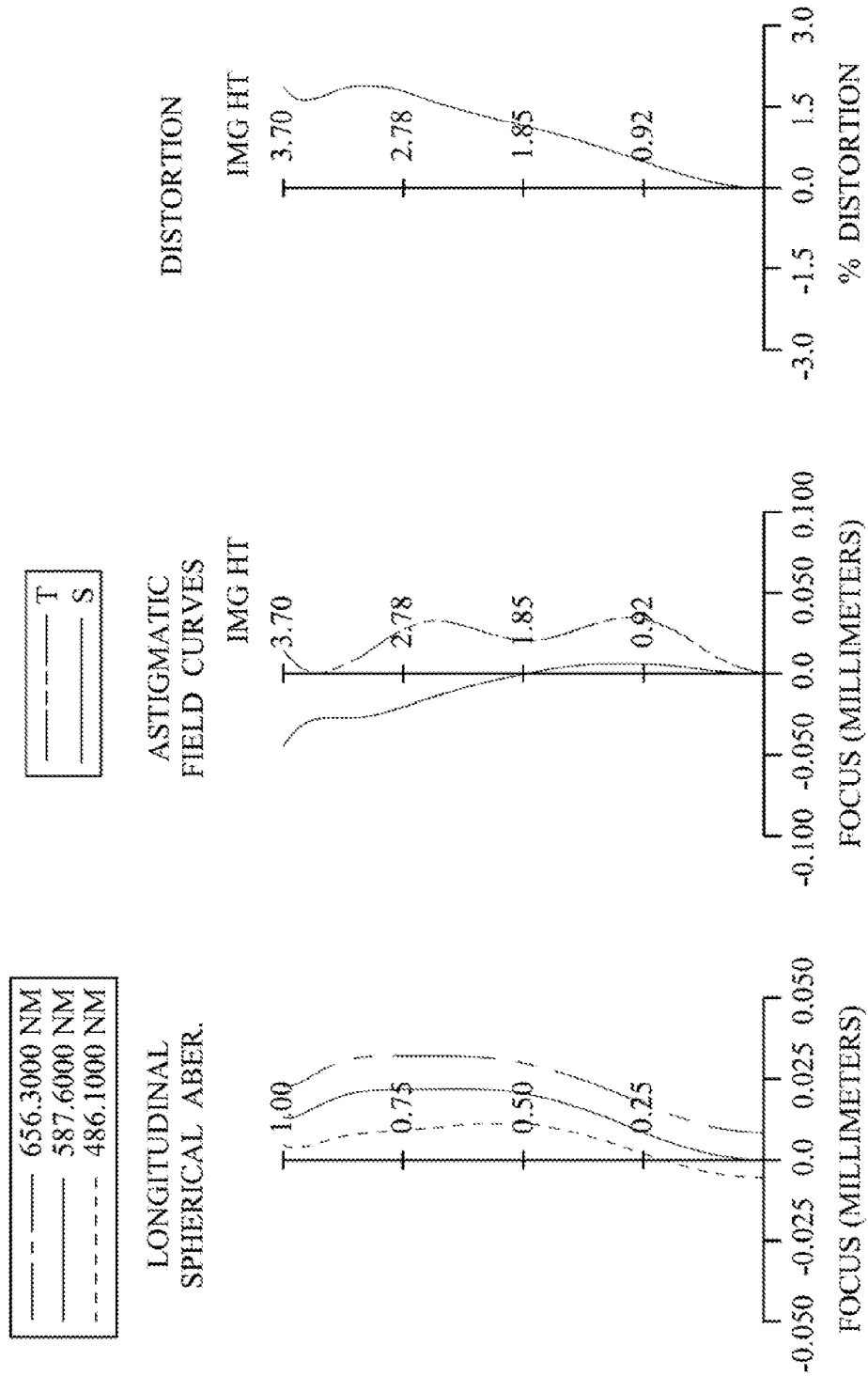
FIG. 6 shows spherical aberration curves, astigmatic field curves and a distortion curve of the image capturing lens assembly according to the 3rd embodiment.

FIG. 5 is a schematic view of an image capturing lens assembly according to the 3rd embodiment of the present disclosure. FIG. 6 shows spherical aberration curves, astigmatic field curves and a distortion curve of the image capturing lens assembly according to the 3rd embodiment. In FIG. 5, the image capturing lens assembly includes, in order from an object side to an image side, a first lens element 310, an aperture stop 300, a second lens element 320, a third lens element 330, a fourth lens element 340, a filter 360 and an image plane 350.

The first lens element 310 with negative refractive power has an object-side surface 311 being convex at a paraxial region and an image-side surface 312 being concave at a paraxial region. The first lens element 310 is made of plastic material, such as OKP4RX50, and has the object-side surface 311 and the image-side surface 312 both being aspheric.

The second lens element 320 with positive refractive power has an object-side surface 321 being convex at a paraxial region and an image-side surface 322 being convex at a paraxial region. The second lens element 320 is made of plastic material, such as APEL-5514ML, and has the object-side surface 321 and the image-side surface 322 both being aspheric.

The third lens element 330 with positive refractive power has an object-side surface 331 being concave at a paraxial region and an image-side surface 332 being convex at a paraxial region. The third lens element 330 is made of plastic material, such as APEL-5514ML, and has the object-side surface 331 and the image-side surface 332 both being aspheric. Furthermore, the point on the optical axis projected from a position of a maximal effective diameter of the image-side surface 332 of the third lens element 330 is closer to the object side than an axial vertex of the object-side surface 331 of the third lens element 330. (Please refer to FIG. 21, and will not provide another figure for the 3rd embodiment).

The fourth lens element 340 with positive refractive power has an object-side surface 341 being convex at a paraxial region and being concave at a peripheral region, and has an image-side surface 342 being concave at a paraxial region and being convex at a peripheral region. The fourth lens element 340 is made of plastic material, such as ZEONEX F52R, and has the object-side surface 341 and the image-side surface 342 both being aspheric.

The filter 360 is located between the fourth lens element 340 and the image plane 350, wherein the filter 360 is made of glass material, such as HOYA BSC7, and will not affect the focal length of the image capturing lens assembly.

The detailed optical data of the 3rd embodiment are shown in Table 5 and the aspheric surface data are shown in Table 6 below.)

TABLE 5

3rd Embodiment
f = 5.18 mm, Fno = 2.37, HFOV = 35.0 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens 1 | 4.017 | (ASP) | 0.976 | Plastic | OKP4RX50 | 1.650 | −8.57 |
| 2 | | 2.111 | (ASP) | 0.269 | | | | |
| 3 | Ape. Stop | Plano | | −0.157 | | | | |
| 4 | Lens 2 | 2.305 | (ASP) | 0.766 | Plastic | APEL-5514ML | 1.544 | 3.30 |
| 5 | | −7.198 | (ASP) | 1.722 | | | | |
| 6 | Lens 3 | −1.132 | (ASP) | 0.479 | Plastic | APEL-5514ML | 1.544 | 84.61 |
| 7 | | −1.269 | (ASP) | 0.070 | | | | |
| 8 | Lens 4 | 1.901 | (ASP) | 1.029 | Plastic | ZEONEX F52R | 1.535 | 62.34 |
| 9 | | 1.636 | (ASP) | 1.200 | | | | |
| 10 | Filter | Plano | | 0.400 | Glass | HOYA BSC7 | 1.517 | — |
| 11 | | Plano | | 0.588 | | | | |
| 12 | Image | Plano | | — | | | | |

The focal length and the refractive index are calculated based on a wavelength of 587.6 nm.

TABLE 6

Aspheric Coefficients

| | Surface # | | | |
|---|---|---|---|---|
| | 1 | 2 | 4 | 5 |
| k = | −5.3871E+00 | −1.1557E+00 | −1.0386E+00 | −1.1178E+00 |
| A4 = | −4.1891E−03 | −4.0976E−02 | −3.8576E−02 | −1.0676E−02 |
| A6 = | 1.5137E−04 | 1.3660E−02 | 9.9984E−03 | −6.1131E−03 |
| A8 = | −1.4476E−04 | −3.7900E−03 | −6.8010E−03 | −3.6380E−03 |
| A10 = | 2.6381E−05 | 4.0747E−03 | 5.2037E−03 | 1.1277E−02 |
| A12 = | | | 2.4398E−05 | −1.1474E−02 |
| A14 = | | | | 4.1203E−03 |

TABLE 6-continued

Aspheric Coefficients

Surface #

| | 6 | 7 | 8 | 9 |
|---|---|---|---|---|
| k = | −3.7975E+00 | −8.1079E−01 | −6.2881E+00 | −4.4071E+00 |
| A4 = | −9.2502E−02 | 2.5539E−02 | −3.0113E−02 | −2.2340E−02 |
| A6 = | 4.0750E−03 | −2.2829E−02 | 7.7314E−03 | 3.7384E−03 |
| A8 = | 6.2106E−03 | 9.6676E−03 | −1.4095E−03 | −4.4661E−04 |
| A10 = | 3.8515E−03 | 1.3845E−03 | 1.4223E−04 | 2.5011E−05 |
| A12 = | −1.2010E−03 | −4.5841E−04 | −8.9853E−06 | −8.2681E−07 |
| A14 = | | −2.1838E−06 | | |

In the optical image system according to the 3rd embodiment, the definitions of f, Fno, HFOV, T23, CT2, CT3, R3, R4, R5, R6, R8, f1, f2, f3, f4, SD and TD are the same as those stated in the 1st embodiment with corresponding values for the 3rd embodiment. Moreover, these parameters can be calculated from Table 5 and Table 6 as the following values and satisfy the following relationships:

| f (mm) | 5.18 | |(R5 − R6)/(R5 + R6)| | 0.06 |
|---|---|---|---|
| Fno | 2.37 | R8/f | 0.32 |
| HFOV (deg.) | 35.0 | |f2/f1| + |f2/f3| + |f2/f4| | 0.48 |
| T23/CT2 | 2.25 | |f1/f3| + |f1/f4| | 0.24 |
| T23/CT3 | 3.59 | SD/TD | 0.76 |
| (R3 + R4)/(R3 − R4) | −0.51 | | |

4th Embodiment

Figure 7:
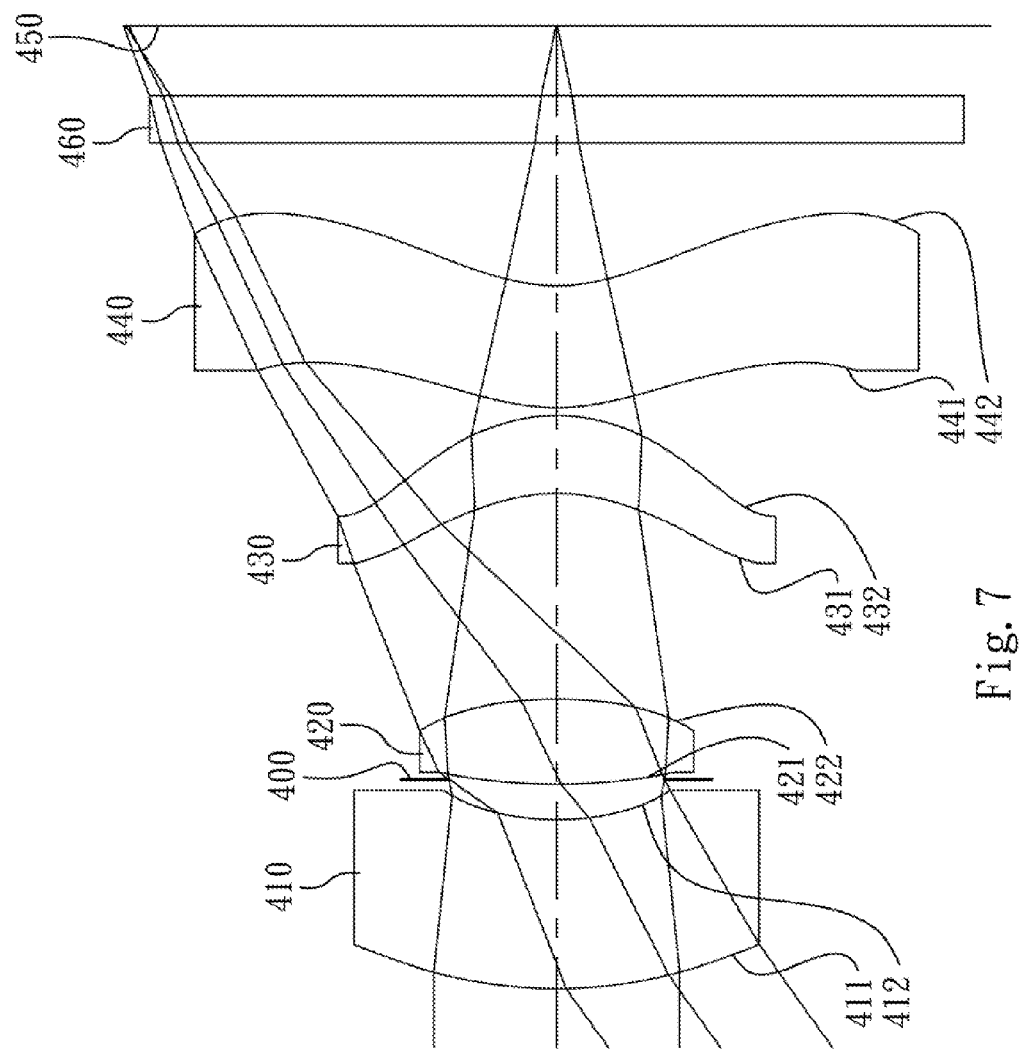
FIG. 7 is a schematic view of an image capturing lens assembly according to the 4th embodiment of the present disclosure.
Figure 8:
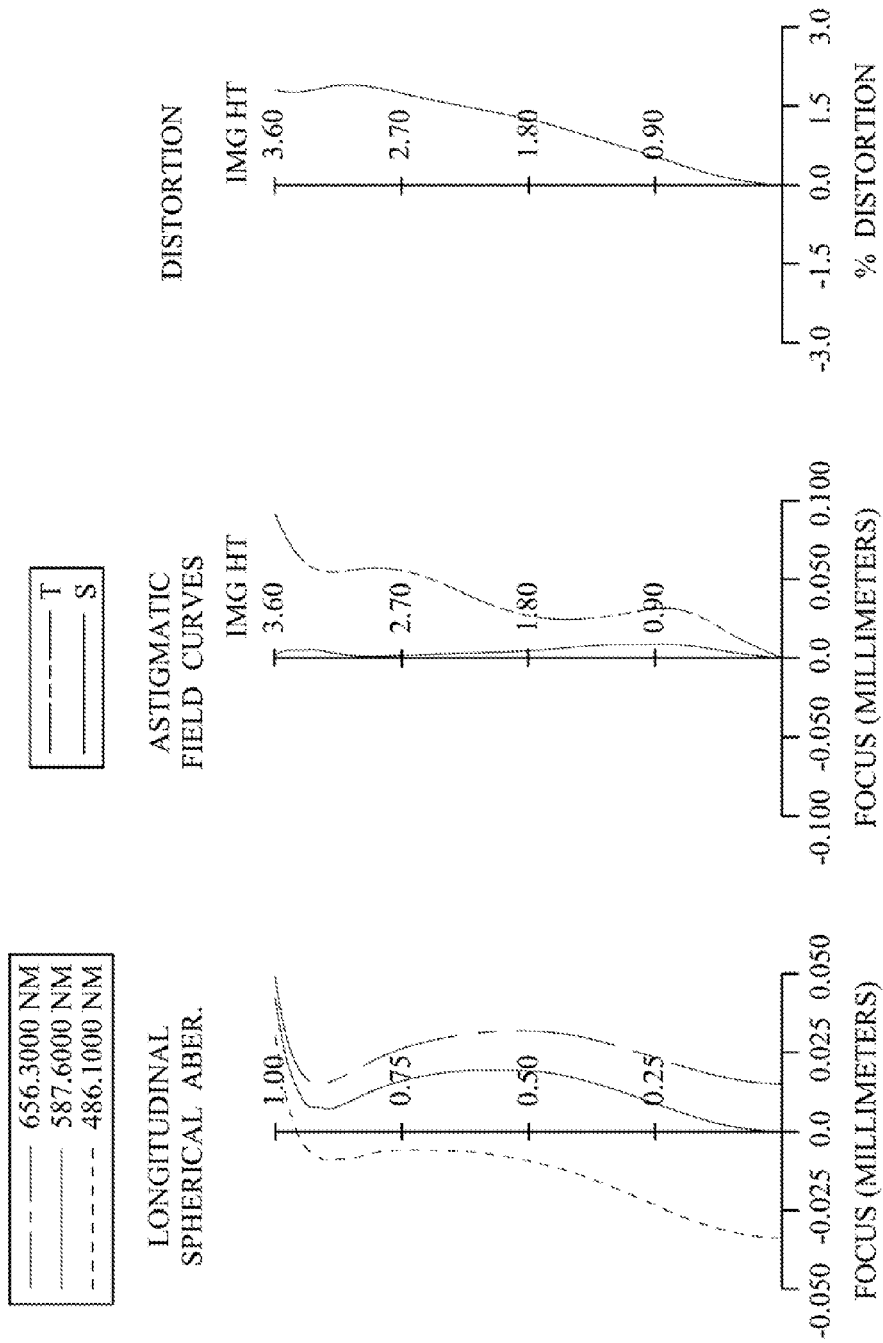
FIG. 8 shows spherical aberration curves, astigmatic field curves and a distortion curve of the image capturing lens assembly according to the 4th embodiment.

FIG. 7 is a schematic view of an image capturing lens assembly according to the 4th embodiment of the present disclosure. FIG. 8 shows spherical aberration curves, astigmatic field curves and a distortion curve of the image capturing lens assembly according to the 4th embodiment. In FIG. 7, the image capturing lens assembly includes, in order from an object side to an image side, a first lens element 410, an aperture stop 400, a second lens element 420, a third lens element 430, a fourth lens element 440, a filter 460 and an image plane 450.

The first lens element 410 with negative refractive power has an object-side surface 411 being convex at a paraxial region and an image-side surface 412 being concave at a paraxial region. The first lens element 410 is made of plastic material, such as TEIJIN SP3810, and has the object-side surface 411 and the image-side surface 412 both being aspheric.

The second lens element 420 with positive refractive power has an object-side surface 421 being convex at a paraxial region and an image-side surface 422 being convex at a paraxial region. The second lens element 420 is made of plastic material, such as ZEONEX F52R, and has the object-side surface 421 and the image-side surface 422 both being aspheric.

The third lens element 430 with positive refractive power has an object-side surface 431 being concave at a paraxial region and an image-side surface 432 being convex at a paraxial region. The third lens element 430 is made of plastic material, such as APEL-5514ML, and has the object-side surface 431 and the image-side surface 432 both being aspheric. Furthermore, the point on the optical axis projected from a position of a maximal effective diameter of the image-side surface 432 of the third lens element 430 is closer to the object side than an axial vertex of the object-side surface 431 of the third lens element 430. (Please refer to FIG. 21, and will not provide another figure for the 4th embodiment.)

The fourth lens element 440 with positive refractive power has an object-side surface 441 being convex at a paraxial region and being concave at a peripheral region, and has an image-side surface 442 being concave at a paraxial region and being convex at a peripheral region. The fourth lens element 440 is made of plastic material, such as ZEONEX F52R, and has the object-side surface 441 and the image-side surface 442 both being asphenc.

The filter 460 is located between the fourth lens element 440 and the image plane 450, wherein the filter 460 is made of glass material, such as HOYA BSC7, and will not affect the focal length of the image capturing lens assembly.

The detailed optical data of the 4th embodiment are shown in Table 7 and the aspheric surface data are shown in Table 8 below.

TABLE 7

4th Embodiment
f = 4.96 mm, Fno = 2.40, HFOV = 35.4 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens 1 | 3.914 | (ASP) | 1.422 | Plastic | TEIJIN SP3810 | 1.640 | −12.36 |
| 2 | | 2.247 | (ASP) | 0.337 | | | | |
| 3 | Ape. Stop | Plano | | −0.042 | | | | |
| 4 | Lens 2 | 5.000 | (ASP) | 0.720 | Plastic | ZEONEX F52R | 1.535 | 3.99 |
| 5 | | −3.527 | (ASP) | 1.733 | | | | |
| 6 | Lens 3 | −1.498 | (ASP) | 0.650 | Plastic | APEL-5514ML | 1.544 | 20.29 |
| 7 | | −1.521 | (ASP) | 0.070 | | | | |
| 8 | Lens 4 | 1.758 | (ASP) | 1.026 | Plastic | ZEONEX F52R | 1.535 | 70.63 |
| 9 | | 1.469 | (ASP) | 1.200 | | | | |
| 10 | Filter | Plano | | 0.400 | Glass | HOYA BSC7 | 1.517 | — |

TABLE 7-continued

4th Embodiment
f = 4.96 mm, Fno = 2.40, HFOV = 35.4 deg.

| Surface # | | Curvature Radius | Thickness | Material | Index | Focal length |
|---|---|---|---|---|---|---|
| 11 | | Plano | 0.584 | | | |
| 12 | Image | Plano | — | | | |

The focal length and the refractive index are calculated based on a wavelength of 587.6 nm.

TABLE 8

Aspheric Coefficients

| | Surface # | | | |
|---|---|---|---|---|
| | 1 | 2 | 4 | 5 |
| k = | −1.6320E+00 | 2.0000E+00 | 4.6065E−01 | 3.2971E+00 |
| A4 = | 2.3625E−03 | 4.6647E−03 | 6.9492E−04 | −1.2487E−02 |
| A6 = | −2.6284E−05 | −1.3772E−03 | −6.8558E−03 | −2.2726E−02 |
| A8 = | −1.1213E−04 | −1.1824E−02 | −7.1487E−04 | 2.6413E−02 |
| A10 = | −2.0017E−05 | 1.6690E−02 | 6.7527E−03 | −1.7007E−02 |
| A12 = | | | 2.4398E−05 | −8.8168E−03 |
| A14 = | | | | 8.4759E−03 |

| | Surface # | | | |
|---|---|---|---|---|
| | 6 | 7 | 8 | 9 |
| k = | −6.4941E+00 | −6.1760E−01 | −5.5606E+00 | −3.7074E+00 |
| A4 = | −6.1063E−02 | 9.4763E−03 | −2.5489E−02 | −2.1790E−02 |
| A6 = | 8.4591E−03 | −1.9564E−03 | 3.0236E−03 | 2.7808E−03 |
| A8 = | 4.1910E−03 | 1.3963E−03 | 1.2063E−04 | −2.0292E−04 |
| A10 = | 8.5970E−04 | 9.2345E−04 | −8.6999E−05 | 2.8918E−07 |
| A12 = | −4.0963E−04 | 1.3073E−04 | 6.2855E−06 | 2.9630E−07 |
| A14 = | −5.6578E−06 | −6.4746E−05 | | |

In the optical image system according to the 4th embodiment, the definitions of f, Fno, HFOV, T23, CT2, CT3, R3, R4, R5, R6, R8, f1, f2, f3, f4, SD and TD are the same as those stated in the 1st embodiment with corresponding values for the 4th embodiment. Moreover, these parameters can be calculated from Table 7 and Table 8 as the following values and satisfy the following relationship

| f (mm) | 4.96 | |(R5 − R6)/(R5 + R6)| | 0.01 |
|---|---|---|---|
| Fno | 2.40 | R8/f | 0.30 |
| HFOV (deg.) | 35.4 | |f2/f1| + |f2/f3| + |f2/f4| | 0.57 |
| T23/CT2 | 2.41 | |f1/f3| + |f1/f4| | 0.78 |
| T23/CT3 | 2.67 | SD/TD | 0.70 |
| (R3 + R4)/(R3 − R4) | 0.17 | | |

5th Embodiment

Figure 9:
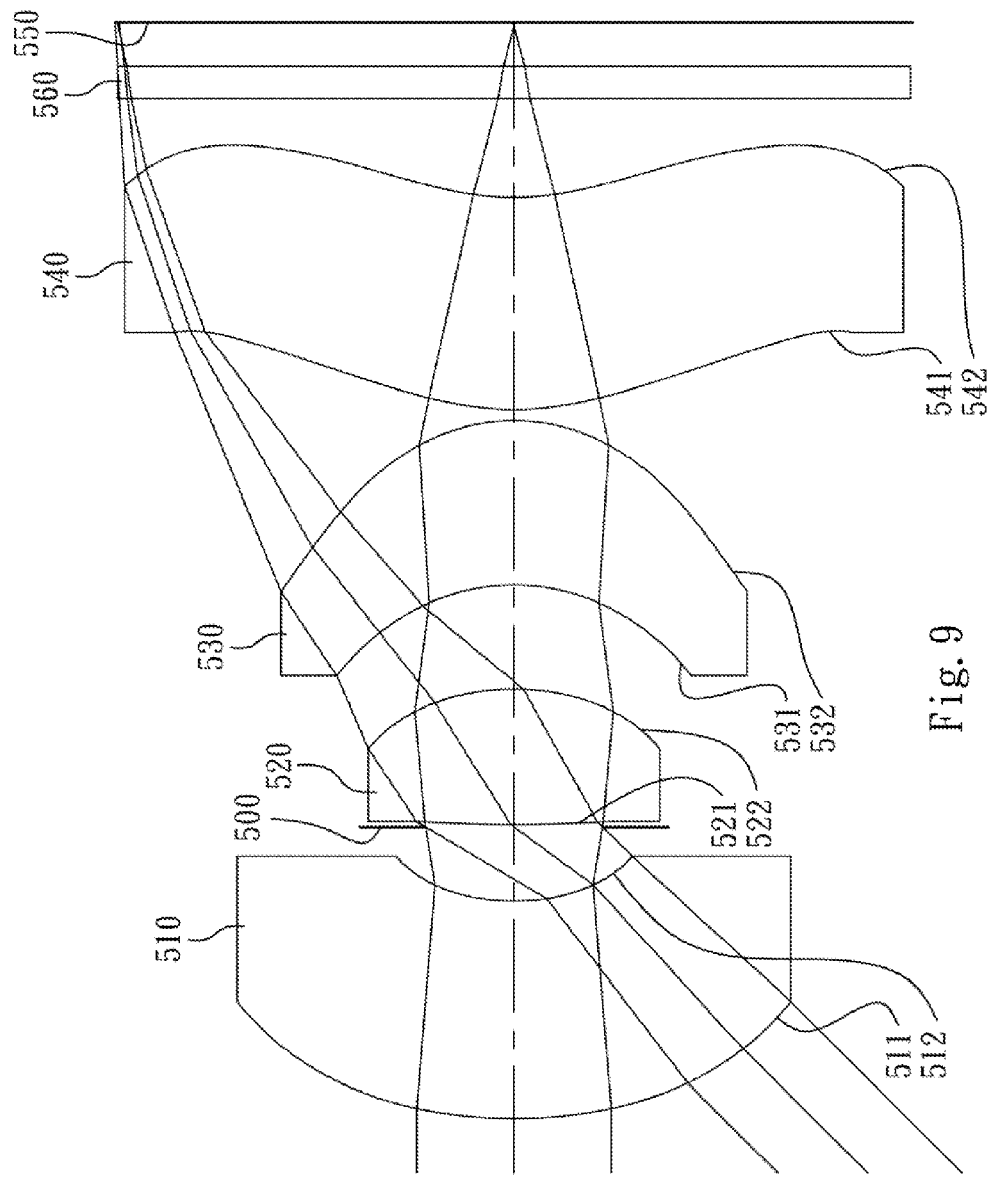
FIG. 9 is a schematic view of an image capturing lens assembly according to the 5th embodiment of the present disclosure.
Figure 10:
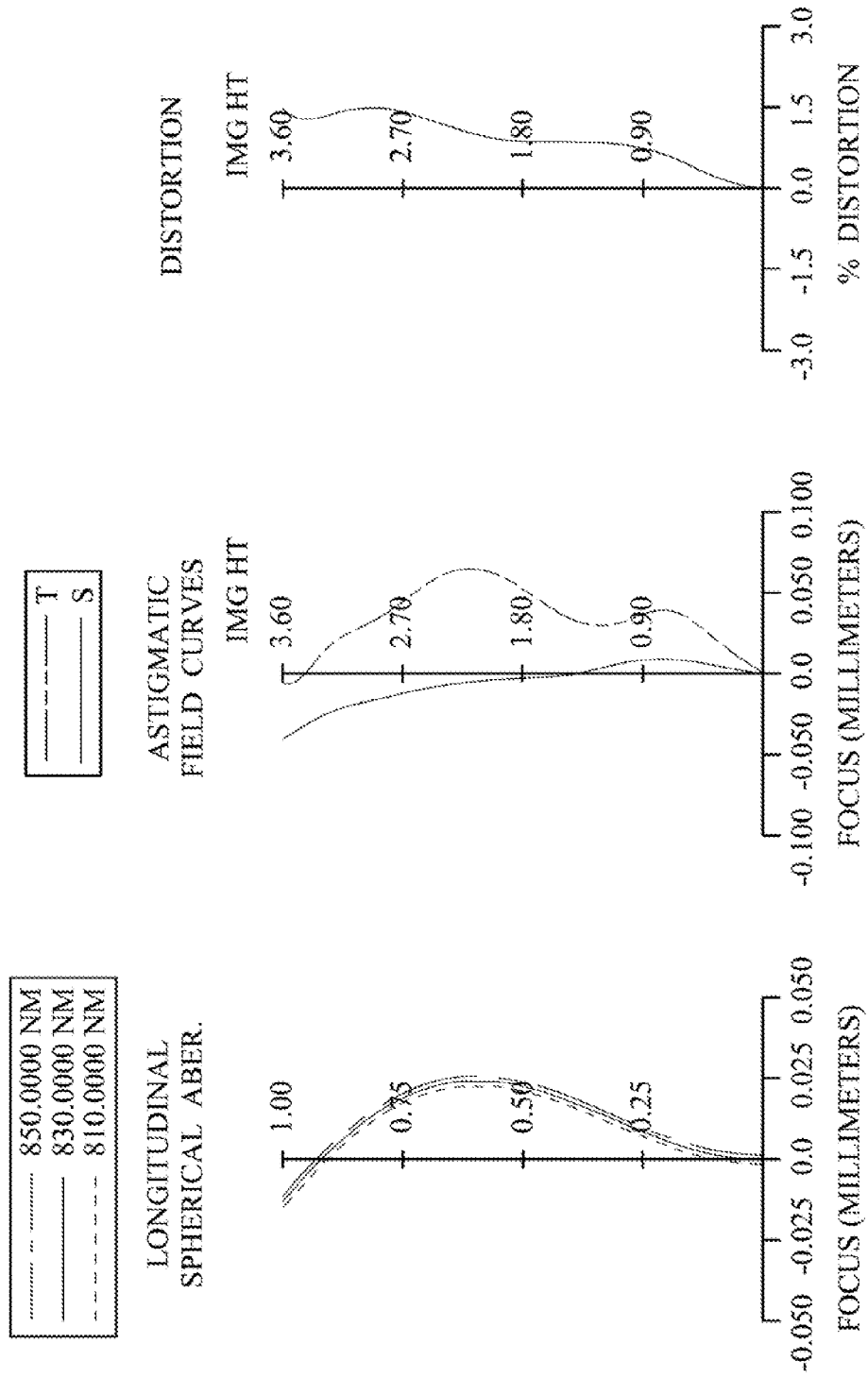
FIG. 10 shows spherical aberration curves, astigmatic field curves and a distortion curve of the image capturing lens assembly according to the 5th embodiment.

FIG. 9 is a schematic view of an image capturing lens assembly according to the 5th embodiment of the present disclosure. FIG. 10 shows spherical aberration curves, astigmatic field curves and a distortion curve of the image capturing lens assembly according to the 5th embodiment. In FIG. 9, the image capturing lens assembly includes, in order from an object side to an image side, a first lens element 510, an aperture stop 500, a second lens element 520, a third lens element 530, a fourth lens element 540, a filter 560 and an image plane 550.

The first lens element 510 with negative refractive power has an object-side surface 511 being convex at a paraxial region and an image-side surface 512 being concave at a paraxial region. The first lens element 510 is made of plastic material, such as OKP4HT, and has the object-side surface 511 and the image-side surface 512 both being aspheric.

The second lens element 520 with positive refractive power has an object-side surface 521 being convex at a paraxial region and an image-side surface 522 being convex at a paraxial region. The second lens element 520 is made of plastic material, such as ZEONEX E48R, and has the object-side surface 521 and the image-side surface 522 both being aspheric.

The third lens element 530 with positive refractive power has an object-side surface 531 being concave at a paraxial region and an image-side surface 532 being convex at a paraxial region. The third lens element 530 is made of plastic material, such as ZEONEX E48R, and has the object-side surface 531 and the image-side surface 532 both being aspheric. Furthermore, the point on the optical axis projected from a position of a maximal effective diameter of the image-side surface 532 of the third lens element 530 is closer to the object side than an axial vertex of the object-side surface 531 of the third lens element 530. (Please refer to FIG. 21, and will not provide another figure for the 5th embodiment.)

The fourth lens element 540 with positive refractive power has an object-side surface 541 being convex at a paraxial region and being concave at a peripheral region, and has an image-side surface 542 being concave at a paraxial region and being convex at a peripheral region. The fourth lens element 540 is made of plastic material, such as ZEONEX E48R, and has the object-side surface 541 and the image-side surface 542 both being aspheric.

The filter 560 is located between the fourth lens element 540 and the image plane 550, wherein the filter 560 is made of glass material, such as HOYA BSC7, and will not affect the focal length of the image capturing lens assembly.

The detailed optical data of the 5th embodiment are shown in Table 9 and the aspheric surface data are shown in Table 10 below.

TABLE 9

5th Embodiment
f = 3.54 mm, Fno = 2.00, HFOV = 45.0 deg.

| Surface # | | Curvature Radius | | Thickness | Material | Index | Focal length |
|---|---|---|---|---|---|---|---|
| 0 | Object | Plano | | Infinity | | | |
| 1 | Lens 1 | 4.570 | (ASP) | 1.982 | Plastic | OKP4HT 1.614 | −8.35 |
| 2 | | 2.018 | ASP | 0.675 | | | |
| 3 | Ape. Stop | Plano | | 0.023 | | | |
| 4 | Lens 2 | 10.947 | (ASP) | 1.231 | Plastic | ZEONEX E48R 1.523 | 3.61 |
| 5 | | −2.197 | (ASP) | 0.950 | | | |
| 6 | Lens 3 | −1.814 | (ASP) | 1.503 | Plastic | ZEONEX E48R 1.523 | 9.78 |
| 7 | | −1.720 | (ASP) | 0.100 | | | |
| 8 | Lens 4 | 2.613 | (ASP) | 1.929 | Plastic | ZEONEX E48R 1.523 | 27.04 |
| 9 | | 2.392 | (ASP) | 0.900 | | | |
| 10 | Filter | Plano | | 0.300 | Glass | HOYA BSC7 1.510 | — |
| 11 | | Plano | | 0.401 | | | |
| 12 | Image | Plano | | — | | | |

The image capturing lens assembly is applied to the infrared wavelength.
The focal length and the refractive index are calculated based on a wavelength of 830 nm.

TABLE 10

Aspheric Coefficients

| | Surface # | | | |
|---|---|---|---|---|
| | 1 | 2 | 4 | 5 |
| k = | −1.0895E−01 | 1.7955E+00 | −1.0000E+00 | 5.9536E−01 |
| A4 = | 6.3303E−03 | 1.6626E−02 | −1.1163E−02 | 2.8272E−03 |
| A6 = | −2.0779E−05 | 2.4104E−03 | 1.8872E−03 | −1.8930E−02 |
| A8 = | 3.4767E−05 | −1.1596E−02 | −6.5740E−03 | 1.6479E−02 |
| A10 = | 8.0663E−07 | 4.6969E−03 | −1.0164E−03 | −1.1200E−02 |
| A12 = | | | 1.3297E−04 | 3.9231E−03 |
| A14 = | | | | −8.0468E−04 |

| | Surface # | | | |
|---|---|---|---|---|
| | 6 | 7 | 8 | 9 |
| k = | −5.7344E+00 | −4.4937E−01 | −5.1658E+00 | −3.5116E+00 |
| A4 = | −7.1236E−02 | −7.4971E−03 | −7.0124E−03 | −1.9609E−02 |
| A6 = | 1.1585E−02 | 3.1654E−03 | 1.6377E−03 | 2.2904E−03 |
| A8 = | −3.1026E−03 | 3.3090E−04 | −2.4125E−04 | −1.4866E−04 |
| A10 = | 3.9971E−04 | −1.6666E−04 | 1.8641E−05 | 2.0927E−06 |
| A12 = | 6.4014E−14 | 1.2439E−05 | −7.5403E−07 | 5.7019E−08 |
| A14 = | | 6.2372E−06 | | |

In the optical image system according to the 5th embodiment, the definitions of f, Fno HFOV, T23, CT2, CT3, R3, R4, R5, R6, R8, f1, f2, f3, f4, SD and TD are the same as those stated in the 1st embodiment with corresponding values for the 5th embodiment. Moreover, these parameters can be calculated from Table 9 and Table 10 as the following values and satisfy the following relationships:

| f (mm) | 3.54 | |(R5 − R6)/(R5 + R6)| | 0.03 |
|---|---|---|---|
| Fno | 2.00 | R8/f | 0.68 |
| HFOV (deg.) | 45.0 | |f2/f1| + |f2/f3| + |f2/f4| | 0.94 |
| T23/CT2 | 0.77 | |f1/f3| + |f1/f4| | 1.16 |
| T23/CT3 | 0.63 | SD/TD | 0.68 |
| (R3 + R4)/(R3 − R4) | 0.67 | | |

6th Embodiment

Figure 11:
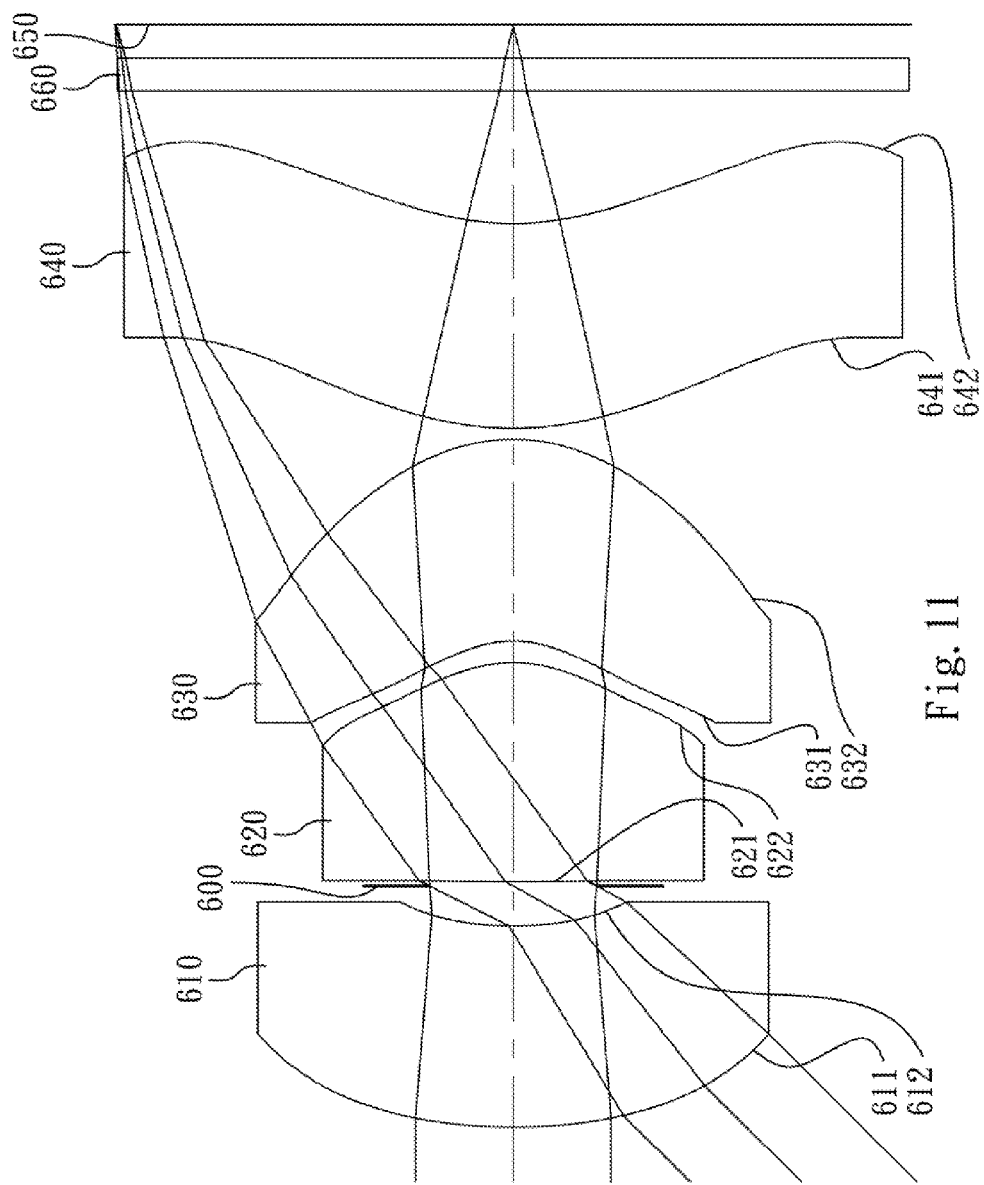
FIG. 11 is a schematic view of an image capturing lens assembly according to the 6th embodiment of the present disclosure.
Figure 12:
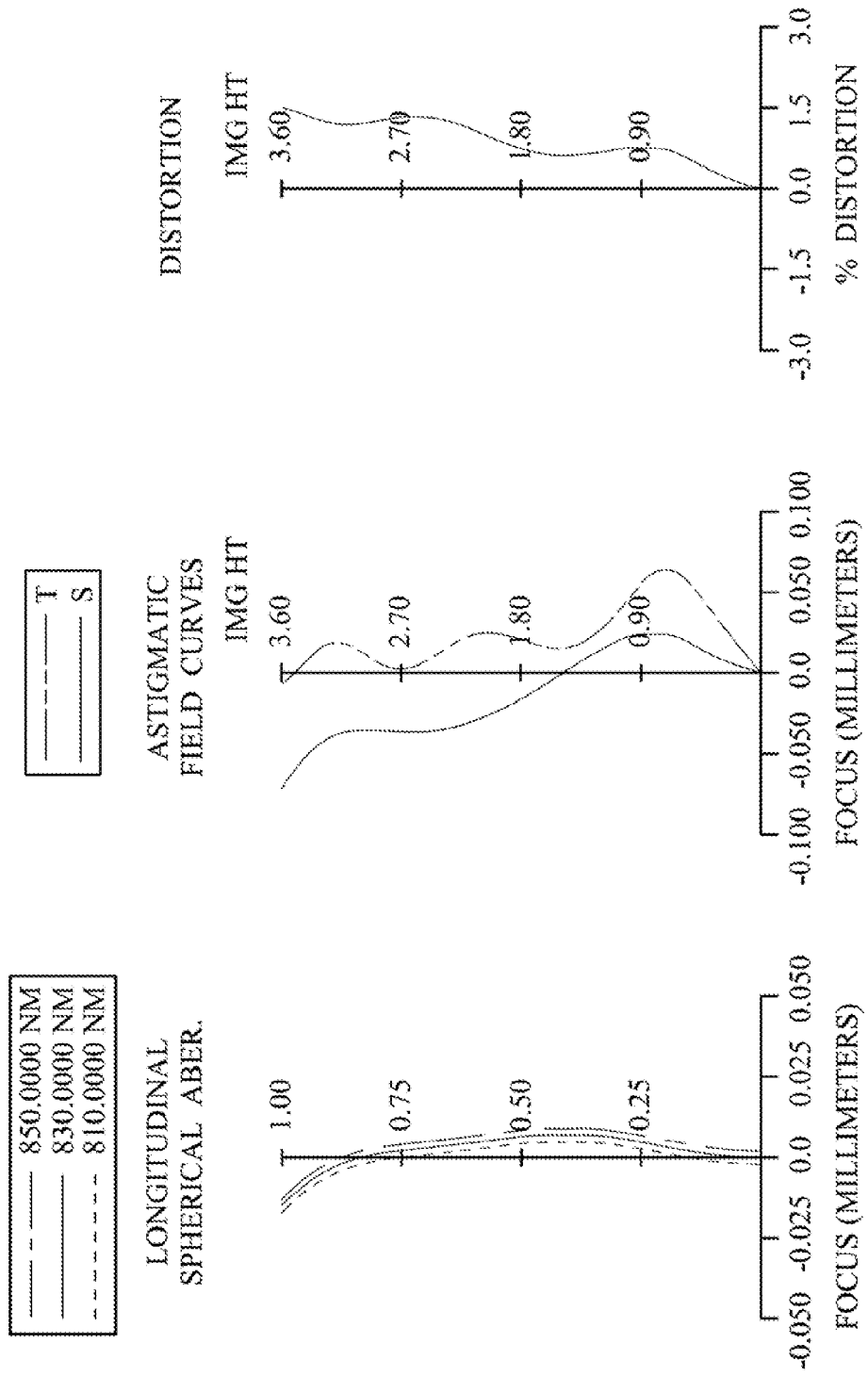
FIG. 12 shows spherical aberration curves, astigmatic field curves and a distortion curve of the image capturing lens assembly according to the 6th embodiment.

FIG. 11 is a schematic view of an image capturing lens assembly according to the 6th embodiment of the present disclosure. FIG. 12 shows spherical aberration curves, astigmatic field curves and a distortion curve of the image capturing lens assembly according to the 6th embodiment. In FIG. 11, the image capturing lens assembly includes, in order from an object side to an image side, a first lens element 610, an aperture stop 600, a second lens element 620, a third lens element 630, a fourth lens element 640, a filter 660 and an image plane 650.

The first lens element 610 with negative refractive power has an object-side surface 611 being convex at a paraxial region and an image-side surface 612 being concave at a paraxial region. The first lens element 610 is made of glass material, such as SUMITA KCD120, and has the object-side surface 611 and the image-side surface 612 both being aspheric.

The second lens element 620 with positive refractive power has an object-side surface 621 being convex at a paraxial region and an image-side surface 622 being convex at a paraxial region. The second lens element 620 is made of plastic material, such as ZEONEX E48R, and has the object-side surface 621 and the image-side surface 622 both being aspheric.

The third lens element 630 with positive refractive power has an object-side surface 631 being concave at a paraxial region and an image-side surface 632 being convex at a paraxial region. The third lens element 630 is made of plastic material, such as ZEONEX E48R, and has the object-side surface 631 and the image-side surface 632 both being aspheric.

The fourth lens element 640 with positive refractive power has an object-side surface 641 being convex at a paraxial region and being concave at a peripheral region, and has an image-side surface 642 being concave at a paraxial region and being convex at a peripheral region. The fourth lens element 640 is made of plastic material, such as ZEONEX E48R, and has the object-side surface 641 and the image-side surface 642 both being aspheric.

The filter 660 is located between the fourth lens element 640 and the image plane 650, wherein the filter 560 is made of glass material, such as HOYA BSC7, and will not affect the focal length of the image capturing lens assembly.

The image capturing lens assembly according to the 6th embodiment is applied to wavelengths of light between 780 nm and 950 nm.

The detailed optical data of the 6th embodiment are shown in Table 11 and the aspheric surface data are shown in Table 12 below.

TABLE 11

6th Embodiment
f = 3.55 mm, Fno = 2.00, HFOV = 45.0 deg.

| Surface # | | Curvature Radius | | Thickness | Material | Index | Focal length |
|---|---|---|---|---|---|---|---|
| 0 | Object | Plano | | Infinity | | | |
| 1 | Lens 1 | 5.063 | (ASP) | 1.825 | Glass | SUMITA KCD120 1.705 | −18.33 |
| 2 | | 3.095 | (ASP) | 0.362 | | | |
| 3 | Ape. Stop | Plano | | 0.040 | | | |
| 4 | Lens 2 | 29.942 | (ASP) | 1.982 | Plastic | ZEONEX E48R 1.523 | 2.34 |
| 5 | | −1.248 | (ASP) | 0.201 | | | |
| 6 | Lens 3 | −0.995 | (ASP) | 1.828 | Plastic | ZEONEX E48R 1.523 | 151.37 |
| 7 | | −1.603 | (ASP) | 0.100 | | | |
| 8 | Lens 4 | 2.913 | (ASP) | 1.856 | Plastic | ZEONEX E48R 1.523 | 168.97 |
| 9 | | 2.354 | (ASP) | 1.200 | | | |
| 10 | Filter | Plano | | 0.300 | Glass | HOYA BSC7 1.510 | — |
| 11 | | Plano | | 0.304 | | | |
| 12 | Image | Plano | | — | | | |

The image capturing lens assembly is applied to the infrared wavelength.
The focal length and the refractive index are calculated based on a wavelength of 830 nm.

TABLE 12

Aspheric Coefficients

| | Surface # | | | |
|---|---|---|---|---|
| | 1 | 2 | 4 | 5 |
| k = | 2.6199E+00 | −3.7276E+00 | −1.0000E+00 | −6.9283E−01 |
| A4 = | 4.7542E+00 | 5.1716E−02 | −9.3558E−03 | 1.2537E−01 |
| A6 = | −2.9421E+00 | −8.6002E−03 | 4.3153E−02 | −2.3136E−02 |
| A8 = | 5.4132E+00 | 1.5296E−02 | −1.2436E−01 | 1.8344E−02 |
| A10 = | −1.6433E+00 | −4.5745E−03 | 1.5367E−01 | −1.1523E−02 |
| A12 = | | | −7.2068E−02 | 2.9689E−03 |
| A14 = | | | | −2.9296E−04 |

| | Surface # | | | |
|---|---|---|---|---|
| | 6 | 7 | 8 | 9 |
| k = | −2.3313E+00 | −7.4365E−01 | −2.9274E+00 | −7.4778E+00 |
| A4 = | 3.3187E−02 | 2.6444E−02 | −1.2975E−03 | 1.7816E−03 |
| A6 = | 1.3071E−02 | −7.9311E−03 | −2.9044E−04 | 2.9961E−04 |
| A8 = | −7.1460E−03 | 1.5547E−03 | 5.8372E−06 | −1.5592E−04 |
| A10 = | 5.7763E−04 | −1.1476E−04 | −1.4314E−06 | 1.1379E−05 |
| A12 = | 4.1549E−05 | −1.6014E−05 | 1.0116E−07 | −2.6462E−07 |
| A14 = | | 3.3524E−06 | | |

In the optical image system according to the 6th embodiment, the definitions of f, Fno, HFOV, T23, CT2, CT3, R3, R4, R5, R6, R8, f1, f2, f3, f4, SD and TD are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.55 | $|(R5 - R6)/(R5 + R6)|$ | 0.23 |
| Fno | 2.00 | R8/f | 0.66 |
| HFOV (deg.) | 45.0 | $|f2/f1| + |f2/f3| + |f2/f4|$ | 0.16 |
| T23/CT2 | 0.10 | $|f1/f3| + |f1/f4|$ | 0.23 |
| T23/CT3 | 0.11 | SD/TD | 0.73 |
| (R3 + R4)/(R3 − R4) | 0.92 | | |

7th Embodiment

Figure 13:
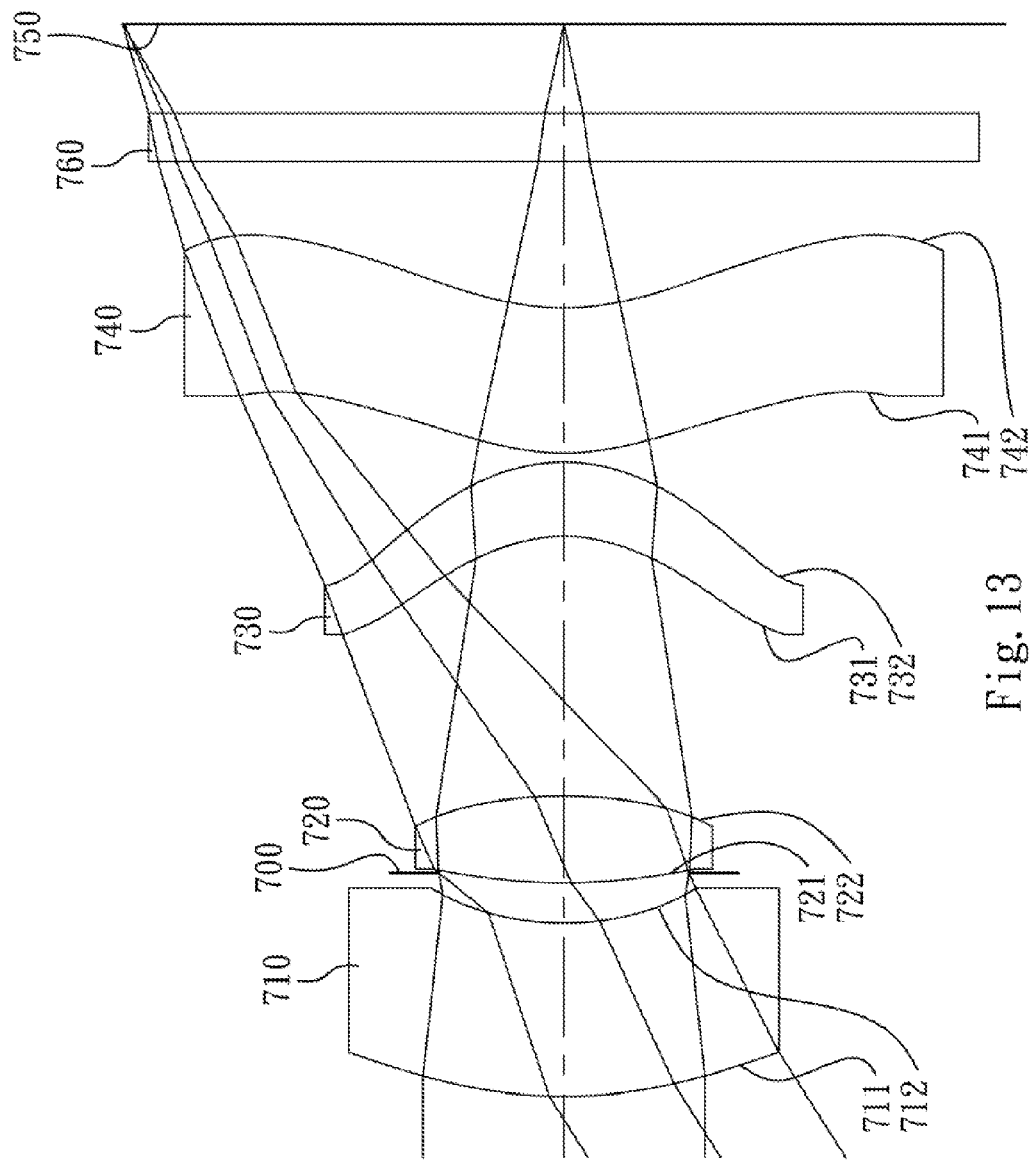
FIG. 13 is a schematic view of an image capturing lens assembly according to the 7th embodiment of the present disclosure.
Figure 14:
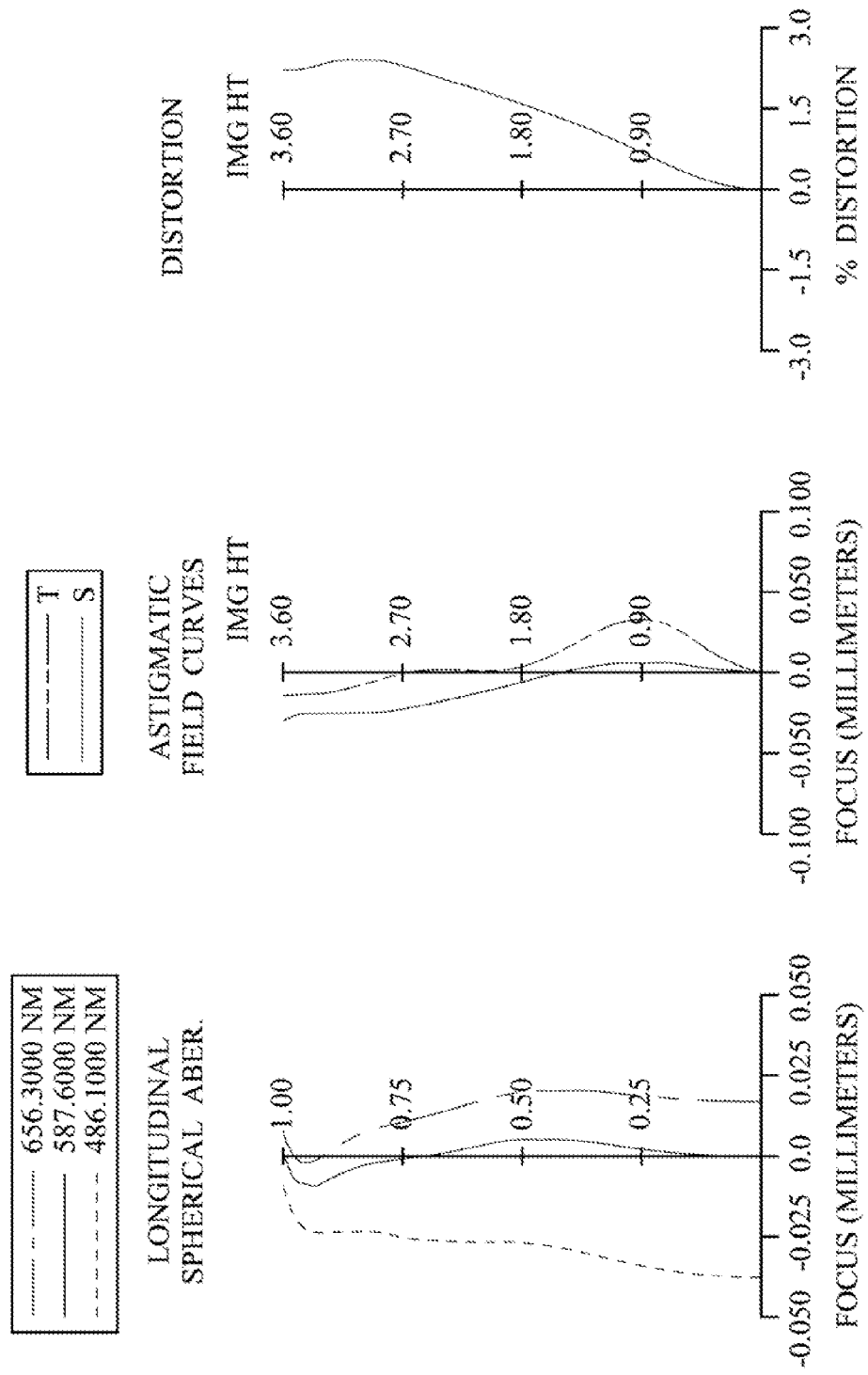
FIG. 14 shows spherical aberration curves, astigmatic field curves and a distortion curve of the image capturing lens assembly according to the 7th embodiment.

FIG. 13 is a schematic view of an image capturing lens assembly according to the 7th embodiment of the present disclosure. FIG. 14 shows spherical aberration curves, astigmatic field curves and a distortion curve of the image capturing lens assembly according to the 7th embodiment. In FIG. 13, the image capturing lens assembly includes, in order from an object side to an image side, a first lens element 710, an aperture stop 700, a second lens element 720, a third lens element 730, a fourth lens element 740, a filter 760 and an image plane 750.

The first lens element 710 with negative refractive power has an object-side surface 711 being convex at a paraxial region and an image-side surface 712 being concave at a paraxial region. The first lens element 710 is made of plastic material, such as TEIJIN SP3810, and has the object-side surface 711 and the image-side surface 712 both being aspheric.

The second lens element 720 with positive refractive power has an object-side surface 721 being convex at a paraxial region and an image-side surface 722 being convex at a paraxial region. The second lens element 720 is made of plastic material, such as ZEONEX F52R, and has the object-side surface 721 and the image-side surface 722 both being aspheric.

The third lens element 730 with positive refractive power has an object-side surface 731 being concave at a paraxial region and an image-side surface 732 being convex at a paraxial region. The third lens element 730 is made of plastic material, such as APEL-5514ML, and has the object-side surface 731 and the image-side surface 732 both being aspheric. Furthermore, the point on the optical axis projected from a position of a maximal effective diameter of the image-side surface 732 of the third lens element 730 is closer to the object side than an axial vertex of the object-side surface 731 of the third lens element 730. (Please refer to FIG. 21, and will not provide another figure for the 7th embodiment.)

The fourth lens element 740 with positive refractive power has an object-side surface 741 being convex at a paraxial region and being concave at a peripheral region, and has an image-side surface 742 being concave at a paraxial region and being convex at a peripheral region. The fourth lens element 740 is made of plastic material, such as ZEONEX F52R, and has the object-side surface 741 and the image-side surface 742 both being aspheric.

The filter 760 is located between the fourth lens element 740 and the image plane 750, wherein the filter 760 is made of glass material, such as HOYA BSC7, and will not affect the focal length of the image capturing lens assembly.

The detailed optical data of the 7th embodiment are shown in Table 13 and the aspheric surface data are shown in Table 14 below.

TABLE 13

7th Embodiment
f = 5.54 mm, Fno = 2.40, HFOV = 32.5 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens 1 | 4.000 | (ASP) | 1.422 | Plastic | TEIJIN SP3810 | 1.640 | −13.62 |
| 2 | | 2.361 | (ASP) | 0.412 | | | | |
| 3 | Ape. Stop | Plano | | −0.081 | | | | |
| 4 | Lens 2 | 5.000 | (ASP) | 0.706 | Plastic | ZEONEX F52R | 1.535 | 4.30 |
| 5 | | −4.041 | (ASP) | 2.129 | | | | |
| 6 | Lens 3 | −1.283 | (ASP) | 0.612 | Plastic | APEL-5514ML | 1.544 | 233.73 |
| 7 | | −1.484 | (ASP) | 0.070 | | | | |
| 8 | Lens 4 | 1.971 | (ASP) | 1.190 | Plastic | ZEONEX F52R | 1.535 | 17.28 |
| 9 | | 1.979 | (ASP) | 1.200 | | | | |
| 10 | Filter | Plano | | 0.400 | Glass | HOYA BSG7 | 1.517 | — |
| 11 | | Plano | | 0.726 | | | | |
| 12 | Image | Plano | | — | | | | |

The focal length and the refractive index are caculated based on a wavelength of 587.6 nm.

TABLE 14

Aspheric Coefficients

| | Surface # | | | |
|---|---|---|---|---|
| | 1 | 2 | 4 | 5 |
| k = | −2.4068E+00 | 2.0000E+00 | −1.5726E−01 | 7.6234E+00 |
| A4 = | 2.2712E−03 | −9.7588E−03 | −2.4209E−03 | −2.7249E−03 |
| A6 = | −6.9558E−04 | −1.3401E−03 | 6.5357E−03 | 9.2266E−03 |

TABLE 14-continued

| Aspheric Coefficients | | | |
|---|---|---|---|
| A8 = | −8.6379E−07 | −6.2631E−03 | −1.3786E−02 | −2.6579E−02 |
| A10 = | −2.4715E−05 | 1.9922E−03 | 9.3493E−03 | 3.8673E−02 |
| A12 = | | | −1.8189E−03 | −2.6945E−02 |
| A14 = | | | | 7.4611E−03 |

| Surface # | | | |
|---|---|---|---|
| 6 | 7 | 8 | 9 |
| k = | −3.5744E+00 | −8.3327E−01 | −5.2536E+00 | −3.6981E+00 |
| A4 = | −3.9072E−02 | 7.2599E−03 | −1.2282E−02 | −1.5645E−02 |
| A6 = | −1.8086E−03 | −2.1298E−03 | 1.1742E−03 | 2.0204E−03 |
| A8 = | 3.8933E−03 | 2.3036E−04 | −3.2213E−05 | −1.9740E−04 |
| A10 = | 1.2569E−03 | 4.9494E−04 | −1.5340E−05 | 7.1229E−06 |
| A12 = | −4.9550E−04 | 1.1914E−04 | 9.2059E−07 | −8.4424E−08 |
| A14 = | 2.6889E−05 | −3.5725E−05 | | |

In the optical image system according to the 7th embodiment, the definitions of f, Fno, HFOV, T23, CT2 CT3, R3, R4, R5 R6, R8, f1, f2, f3, f4, SD and TD are the same as those stated in the 1st embodiment with corresponding values for the 7th embodiment. Moreover, these parameters can be calculated from Table 13 and Table 14 as the following values and satisfy the following relationships:

| f (mm) | 5.54 | |(R5 − R6)/(R5 + R6)| | 0.07 |
| Fno | 2.40 | R8/f | 0.36 |
| HFOV (deg.) | 32.5 | |f2/f1| + |f2/f3| + |f2/f4| | 0.58 |
| T23/CT2 | 3.02 | |f1/f3| + |f1/f4| | 0.85 |
| T23/CT3 | 3.48 | SD/TD | 0.72 |
| (R3 + R4)/(R3 − R4) | 0.11 | | |

8th Embodiment

Figure 15:
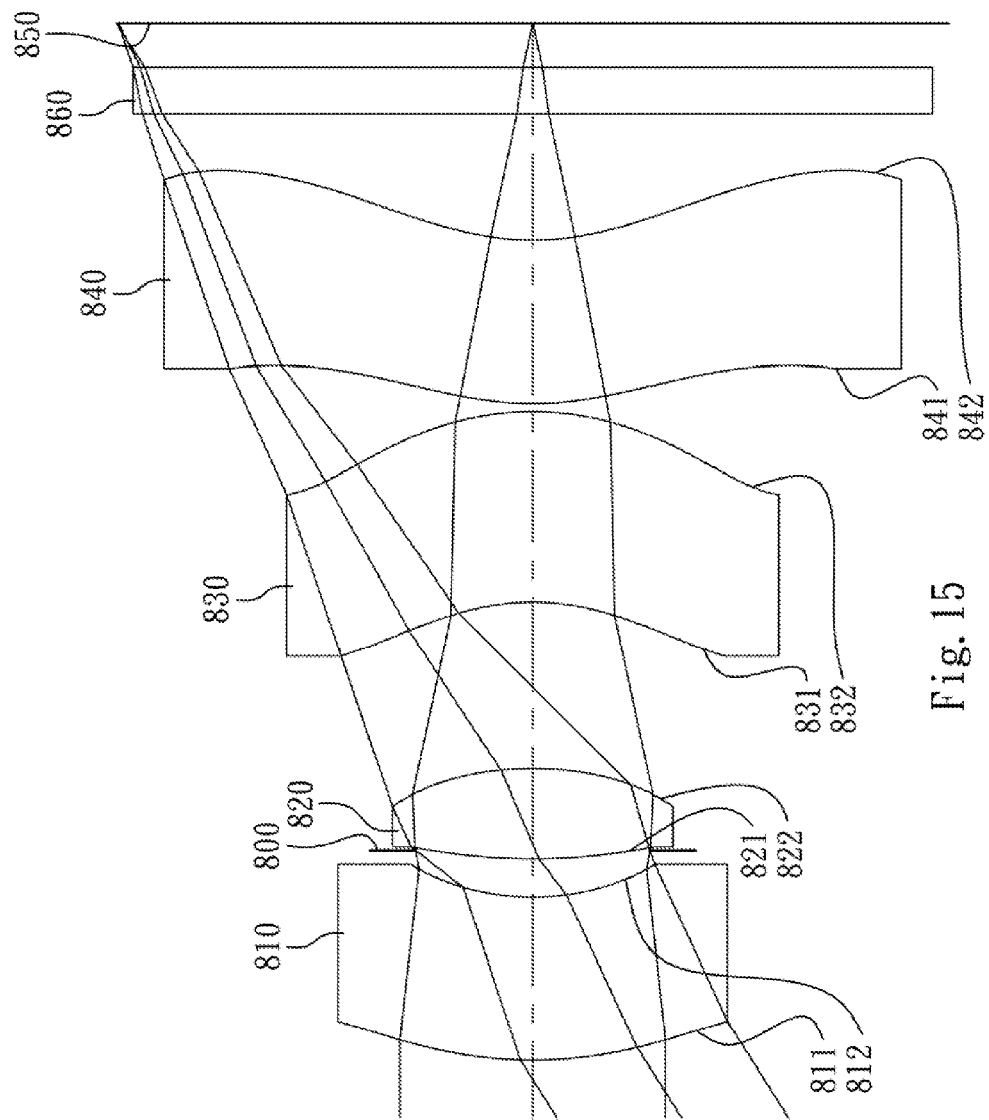
FIG. 15 is a schematic view of an image capturing lens assembly according to the 8th embodiment of the present disclosure.
Figure 16:
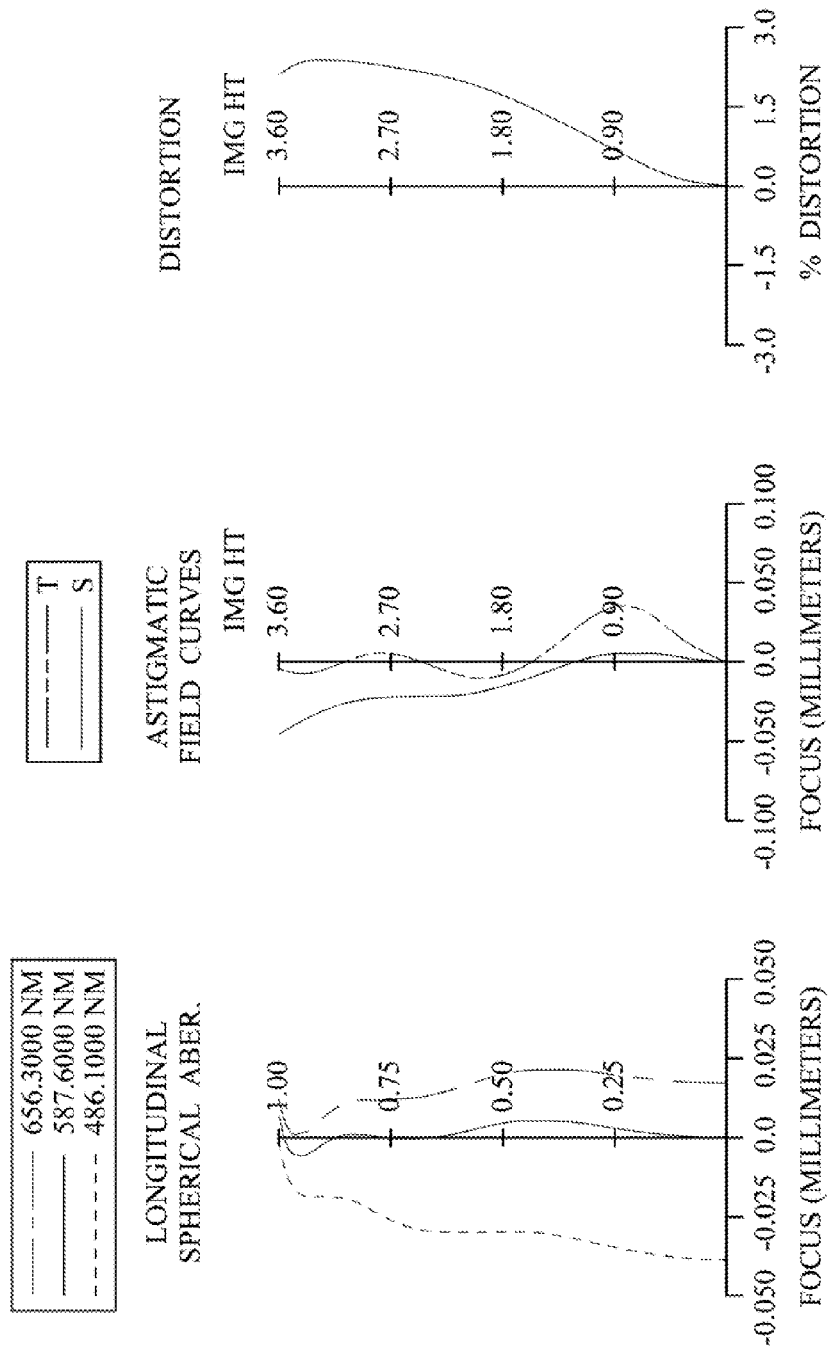
FIG. 16 shows spherical aberration curves, astigmatic field curves and a distortion curve of the image capturing lens assembly according to the 8th embodiment.
Figure 18:
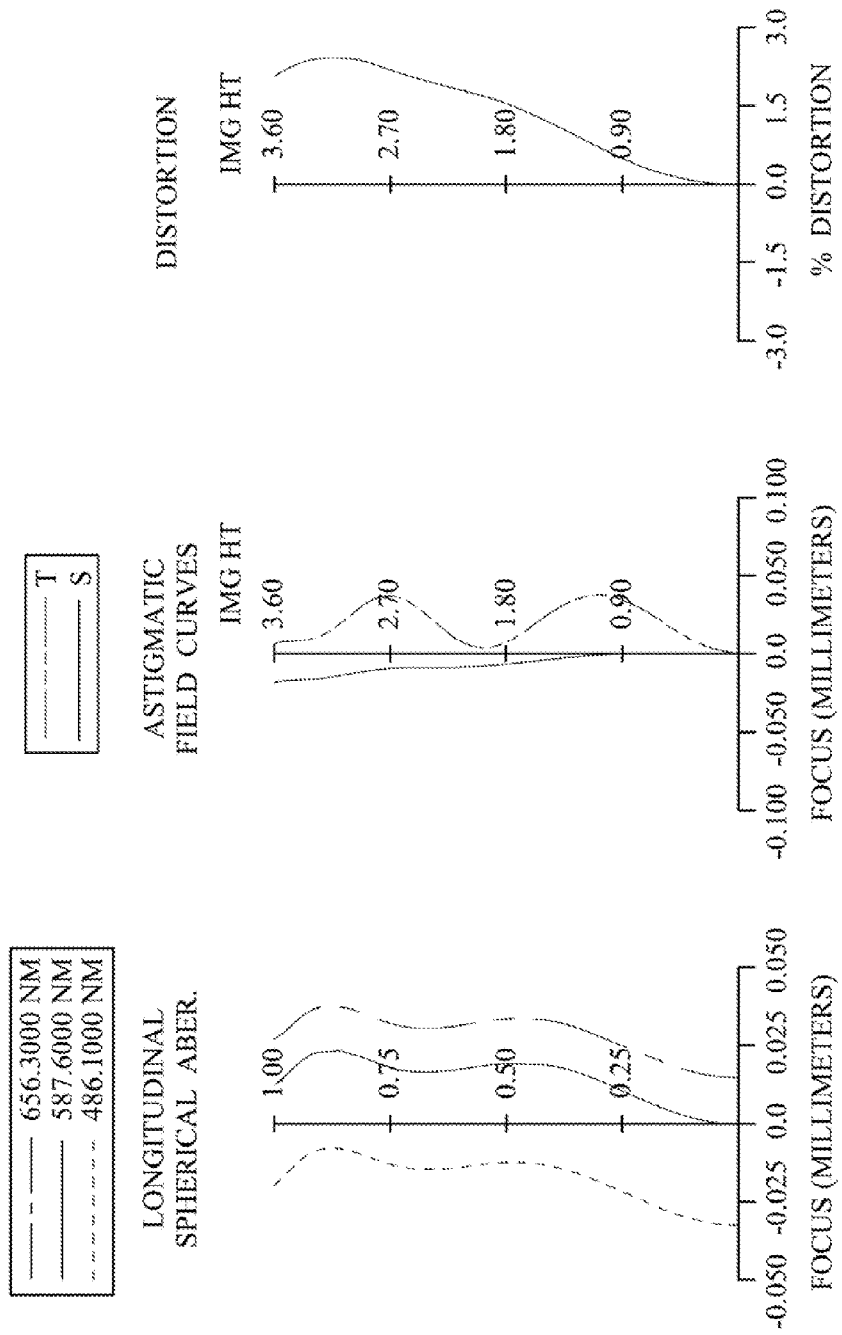
FIG. 18 shows spherical aberration curves, astigmatic field curves and a distortion curve of the image capturing lens assembly according to the 9th embodiment.

FIG. 15 is a schematic view of an image capturing lens assembly according to the 8th embodiment of the present disclosure. FIG. 18 shows spherical aberration curves, astigmatic field curves and a distortion curve of the image capturing lens assembly according to the 8th embodiment. In FIG. 15, the image capturing lens assembly includes, in order from an object side to an image side, a first lens element 810, an aperture stop 800, a second lens element 820, a third lens element 830, a fourth lens element 840, a filter 860 and an image plane 850.

The first lens element 810 with negative refractive power has an object-side surface 811 being convex at a paraxial region and an image-side surface 812 being concave at a paraxial region. The first lens element 810 is made of plastic material, such as TEIJIN SP3810, and has the object-side surface 811 and the image-side surface 812 both being aspheric.

The second lens element 820 with positive refractive power has an object-side surface 821 being convex at a paraxial region and an image-side surface 822 being convex at a paraxial region. The second lens element 820 is made of plastic material, such as ZEONEX F52R, and has the object-side surface 821 and the image-side surface 822 both being aspheric.

The third lens element 830 with positive refractive power has an object-side surface 831 being concave at a paraxial region and an image-side surface 832 being convex at a paraxial region. The third lens element 830 is made of plastic material, such as APEL-5514ML, and has the object-side surface 831 and the image-side surface 832 both being aspheric.

The fourth lens element 840 with positive refractive power has an object-side surface 841 being convex at a paraxial region and being concave at a peripheral region, and has an image-side surface 842 being concave at a paraxial region and being convex at a peripheral region. The fourth lens element 840 is made of plastic material, such as ZEONEX F52R, and has the object-side surface 841 and the image-side surface 842 both being aspheric.

The filter 860 is located between the fourth lens element 840 and the image plane 850, wherein the filter 860 is made of glass material, such as HOYA BSC7, and will not affect the focal length of the image capturing lens assembly.

The detailed optical data of the 8th embodiment are shown in Table 15 and the aspheric surface data are shown in Table 16 below.

TABLE 15

8th Embodiment
f = 5.55 mm, Fno = 2.40, HFOV = 32.5 deg.

| Surface # | | Curvature Radius | Thickness | | Material | Index | Focal length |
|---|---|---|---|---|---|---|---|
| 0 | Object | Plano | Infinity | | | | |
| 1 | Lens 1 | 3.660 | (ASP) | 1.422 | Plastic | TEIJIN SP3810 | 1.640 | −14.28 |
| 2 | | 2.217 | (ASP) | 0.406 | | | | |
| 3 | Ape. Stop | Plano | −0.074 | | | | |
| 4 | Lens 2 | 5.000 | (ASP) | 0.783 | Plastic | ZEONEX F52R | 1.535 | 3.50 |
| 5 | | −2.833 | (ASP) | 1.452 | | | | |
| 6 | Lens 3 | −2.028 | (ASP) | 1.658 | Plastic | APEL-5514ML | 1.544 | 235.55 |
| 7 | | −2.572 | (ASP) | 0.070 | | | | |
| 8 | Lens 4 | 2.729 | (ASP) | 1.422 | Plastic | ZEONEX F52R | 1.535 | 176.72 |
| 9 | | 2.300 | (ASP) | 1.100 | | | | |

TABLE 15-continued

8th Embodiment
f = 5.55 mm, Fno = 2.40, HFOV = 32.5 deg.

| Surface # | | Curvature Radius | Thickness | Material | Index | Focal length |
|---|---|---|---|---|---|---|
| 10 | Filter | Plano | 0.400 | Glass | HOYA BSC7 | 1.517 | — |
| 11 | | Plano | 0.388 | | | |
| 12 | Image | Plano | — | | | |

The focal length and the refractive index are calculated based on a wavelength of 587.6 nm.

TABLE 16

Aspheric Coefficients

| | Surface # | | | |
|---|---|---|---|---|
| | 1 | 2 | 4 | 5 |
| k = | −2.1628E+00 | 2.0000E+00 | −2.8864E+00 | 3.1024E+00 |
| A4 = | 1.5966E−03 | −1.7635E−02 | −4.9813E−03 | 3.2635E−03 |
| A6 = | −1.6852E−03 | −6.8309E−03 | 7.8256E−03 | 9.1074E−03 |
| A8 = | 2.5214E−04 | −3.8913E−03 | −1.2790E−02 | −2.3779E−02 |
| A10 = | −1.3308E−04 | −1.5524E−03 | 6.0490E−03 | 3.7554E−02 |
| A12 = | | | 1.3818E−05 | −2.7350E−02 |
| A14 = | | | | 7.7674E−03 |

| | Surface # | | | |
|---|---|---|---|---|
| | 6 | 7 | 8 | 9 |
| k = | −3.8707E+00 | −6.9891E−01 | −6.9945E+00 | −1.8028E+00 |
| A4 = | −7.4735E−03 | −1.2242E−02 | −1.0418E−02 | −2.4201E−02 |
| A6 = | −1.7902E−04 | 6.9817E−03 | −3.2090E−04 | 2.7230E−03 |
| A8 = | 2.3646E−03 | −6.9005E−04 | 1.4139E−04 | −2.3866E−04 |
| A10 = | 6.3236E−04 | −7.0042E−05 | −5.4623E−06 | 1.3250E−05 |
| A12 = | −4.9052E−04 | 5.1191E−05 | −3.7045E−07 | −3.8388E−07 |
| A14 = | 5.8174E−05 | −5.2775E−06 | | |

In the optical image system according to the 8th embodiment, the definitions of f, Fno, HFOV, T23, CT2, CT3, R3, R4, R5, R6, R8, f1, f2, f3, f4, SD and TD are the same as those stated in the 1st embodiment with corresponding values for the 8th embodiment. Moreover, these parameters can be calculated from Table 15 and Table 16 as the following values and satisfy the following relationships:

| f (mm) | 5.55 | |(R5 − R6)/(R5 + R6)| | 0.12 |
|---|---|---|---|
| Fno | 2.40 | R8/f | 0.41 |
| HFOV (deg.) | 32.5 | |f2/f1| + |f2/f3| + |f2/f4| | 0.28 |
| T23/CT2 | 1.85 | |f1/f3| + |f1/f4| | 0.14 |
| T23/CT3 | 0.88 | SD/TD | 0.74 |
| (R3 + R4)/(R3 − R4) | 0.28 | | |

9th Embodiment

Figure 17:
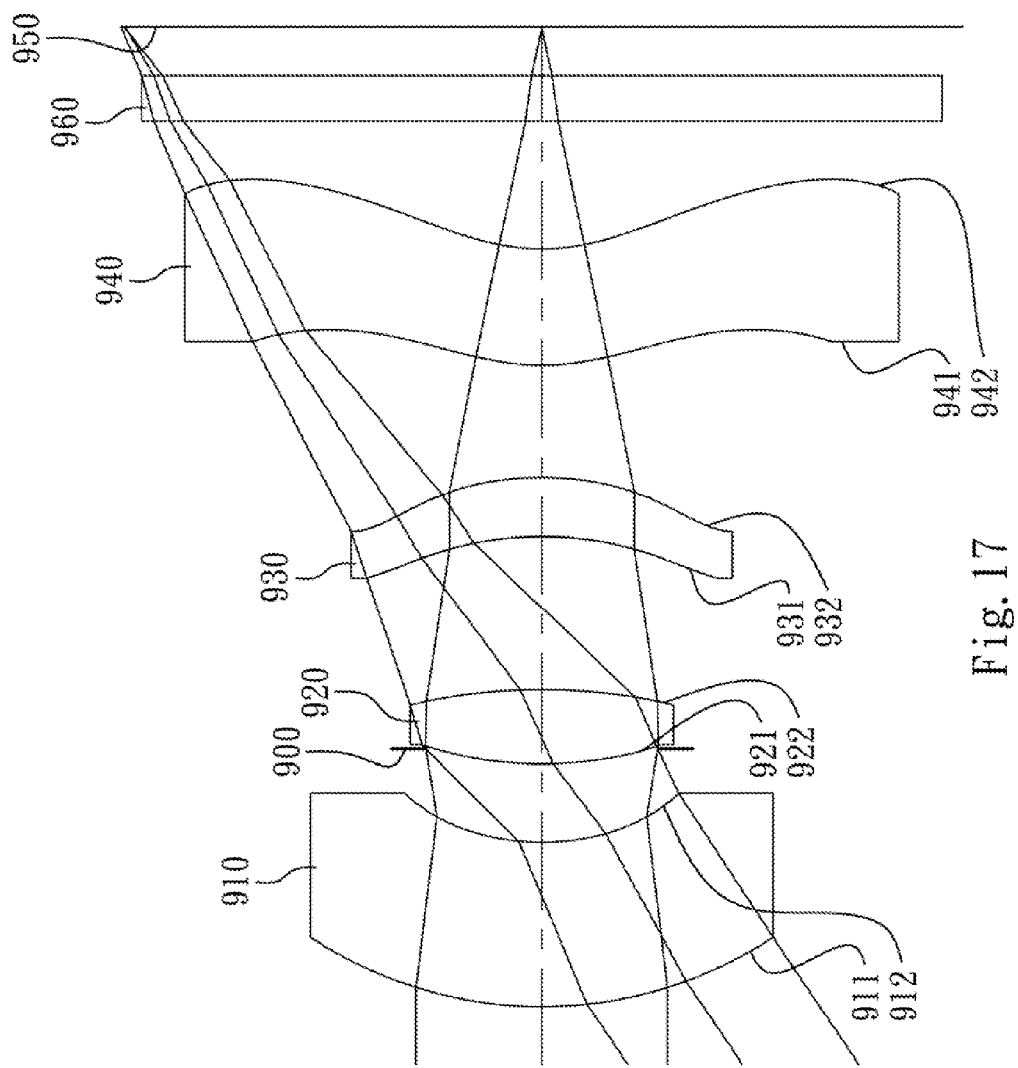
FIG. 17 is a schematic view of an image capturing lens assembly according to the 9th embodiment of the present disclosure.

FIG. 17 is a schematic view of an image capturing lens assembly according to the 9th embodiment of the present disclosure. FIG. 18 shows spherical aberration curves, astigmatic field curves and a distortion curve of the image capturing lens assembly according to the 9th embodiment. In FIG. 17, the image capturing lens assembly includes, in order from an object side to an image side, a first lens element 910, an aperture stop 900, a second lens element 920, a third lens element 930, a fourth lens element 940, a filter 960 and an image plane 950.

The first lens element 910 with negative refractive power has an object-side surface 911 being convex at a paraxial region and an image-side surface 912 being concave at a paraxial region. The first lens element 910 is made of plastic material, such as TEIJIN SP3810, and has the object-side surface 911 and the image-side surface 912 both being aspheric.

The second lens element 920 with positive refractive power has an object-side surface 921 being convex at a paraxial region and an image-side surface 922 being convex at a paraxial region. The second lens element 920 is made of plastic material, such as ZEONEX F52R, and has the object-side surface 921 and the image-side surface 922 both being aspheric.

The third lens element 930 with positive refractive power has an object-side surface 931 being concave at a paraxial region and an image-side surface 932 being convex at a paraxial region. The third lens element 930 is made of plastic material, such as APEL-5514ML, and has the object-side surface 931 and the image-side surface 932 both being aspheric.

The fourth lens element 940 with positive refractive power has an object-side surface 941 being convex at a paraxial region and being concave at a peripheral region, and has an image-side surface 942 being concave at a paraxial region and being convex at a peripheral region. The fourth lens element 940 is made of plastic material, such as ZEONEX F52R, and has the object-side surface 941 and the image-side surface 942 both being aspheric.

The filter 960 is located between the fourth lens element 940 and the image plane 950, wherein the filter 960 is made of glass material, such as HOYA BSC7, and will not affect the focal length of the image capturing lens assembly.

The detailed optical data of the 9th embodiment are shown in Table 17 its and the aspheric surface data are shown in Table 18 below.

TABLE 17

9th Embodiment
f = 5.21 mm, Fno = 2.40, HFOV = 34.0 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens | 3.656 | (ASP) | 1.422 | Plastic | TEIJIN SP3810 | 1.640 | −12.42 |
| 2 | | 2.124 | (ASP) | 0.805 | | | | |
| 3 | Ape. Stop | Plano | | −0.130 | | | | |
| 4 | Lens 2 | 3.501 | (ASP) | 0.643 | Plastic | ZEONEX F52R | 1.535 | 4.16 |
| 5 | | −5.694 | (ASP) | 1.321 | | | | |
| 6 | Lens 3 | −3.341 | (ASP) | 0.513 | Plastic | APEL-5514ML | 1.544 | 26.22 |
| 7 | | −2.853 | (ASP) | 0.972 | | | | |
| 8 | Lens 4 | 2.049 | (ASP) | 1.004 | Plastic | ZEONEX F52R | 1.535 | 198.30 |
| 9 | | 1.733 | (ASP) | 1.100 | | | | |
| 10 | Filter | Plano | | 0.400 | Glass | HOYA BSC7 | 1.517 | — |
| 11 | | Plano | | 0.421 | | | | |
| 12 | Image | Plano | | — | | | | |

The focal length and the refractive index are calculated based on a wavelength of 587.6 nm.

TABLE 18

Aspheric Coefficients

| | Surface # | | | |
|---|---|---|---|---|
| | 1 | 2 | 4 | 5 |
| k = | −1.0017E+00 | 1.3101E+00 | 6.9319E−01 | 5.3597E+00 |
| A4 = | 3.5246E−03 | 1.4325E−03 | −2.9841E−04 | −7.5748E−03 |
| A6 = | −4.4095E−05 | −2.3487E−03 | 5.1397E−03 | −7.9300E−03 |
| A8 = | 5.7444E−05 | 1.4587E−03 | −4.8350E−03 | 1.1477E−05 |
| A10 = | −1.7483E−05 | −1.4560E−03 | 1.9088E−03 | 1.6050E−02 |
| A12 = | | | 1.5012E−03 | −1.8913E−02 |
| A14 = | | | | 7.4443E−03 |

| | Surface # | | | |
|---|---|---|---|---|
| | 6 | 7 | 8 | 9 |
| k = | −1.0124E+01 | −3.0464E−01 | −3.6042E+00 | −2.2479E+00 |
| A4 = | −5.6255E−02 | −4.8391E−02 | −3.5902E−02 | −3.4908E−02 |
| A6 = | 7.5219E−03 | 1.4873E−02 | 2.2540E−03 | 5.1462E−03 |
| A8 = | 5.0539E−03 | −3.1025E−04 | 5.6154E−04 | −4.7183E−04 |
| A10 = | 9.2157E−04 | 9.6327E−04 | −1.1522E−04 | 2.2736E−05 |
| A12 = | −6.1670E−04 | 2.6008E−04 | 5.8254E−06 | −5.4268E−07 |
| A14 = | −1.7315E−05 | −1.2461E−04 | | |

In the optical image system according to the 9th embodiment, the definitions of f, Fno, HFOV, T23, CT2, CT3, R3, R4, R5, R6, R8, f1, f2, f3, f4, SD and TD are the same as those stated in the 1st embodiment with corresponding values for the 9th embodiment. Moreover, these parameters can be calculated from Table 17 and Table 18 as the following values and satisfy the following relationships:

| f (mm) | 5.21 | |(R5 − R6)/(R5 + R6)| | 0.08 |
|---|---|---|---|
| Fno | 2.40 | R8/f | 0.33 |
| HFOV (deg.) | 34.0 | |f2/f1| + |f2/f3| + |f2/f4| | 0.52 |
| T23/CT2 | 2.05 | |f1/f3| + |f1/f4| | 0.54 |
| T23/CT3 | 2.58 | SD/TD | 0.66 |
| (R3 + R4)/(R3 − R4) | −0.24 | | |

10th Embodiment

Figure 19:
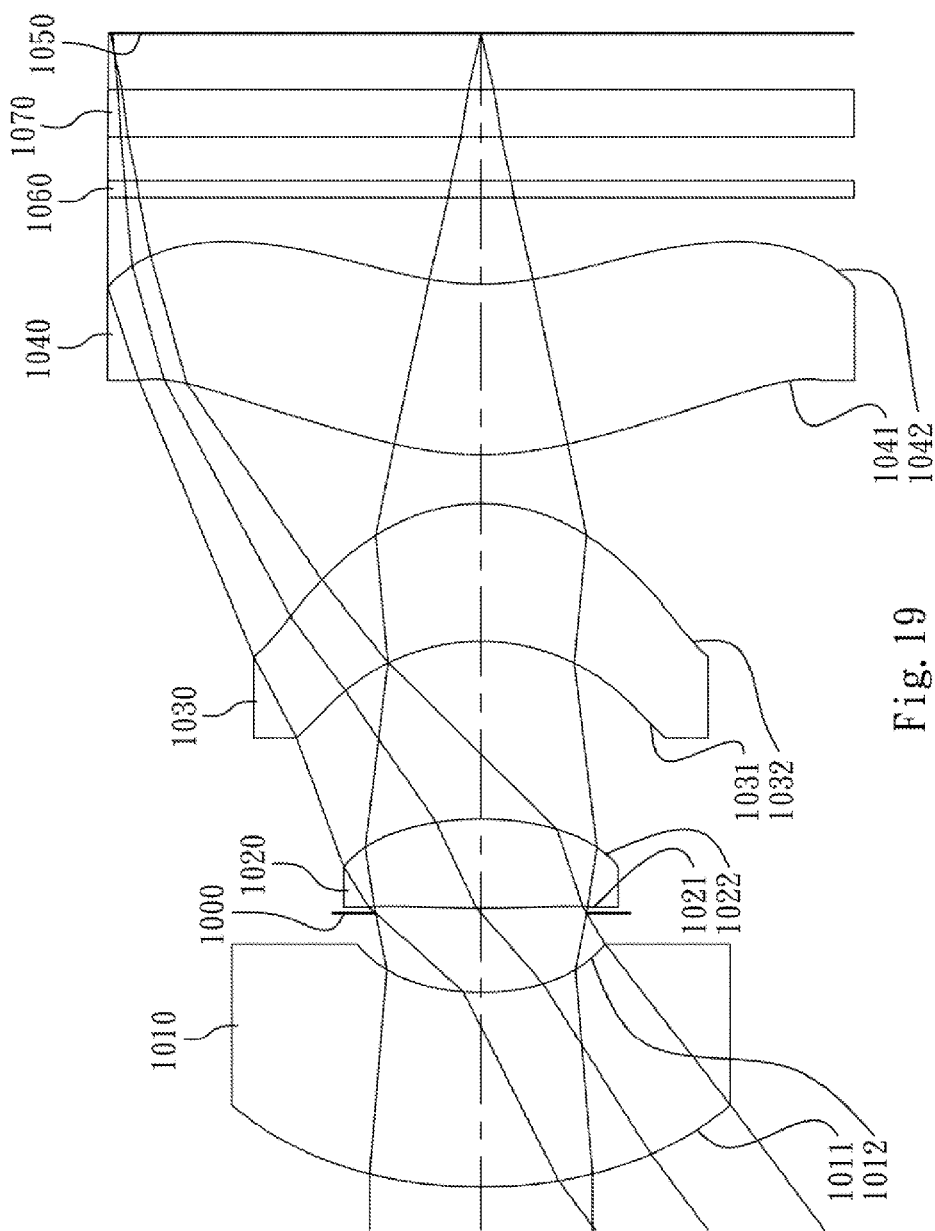
FIG. 19 is a schematic view of an image capturing lens assembly according to the 10th embodiment of the present disclosure.
Figure 20:
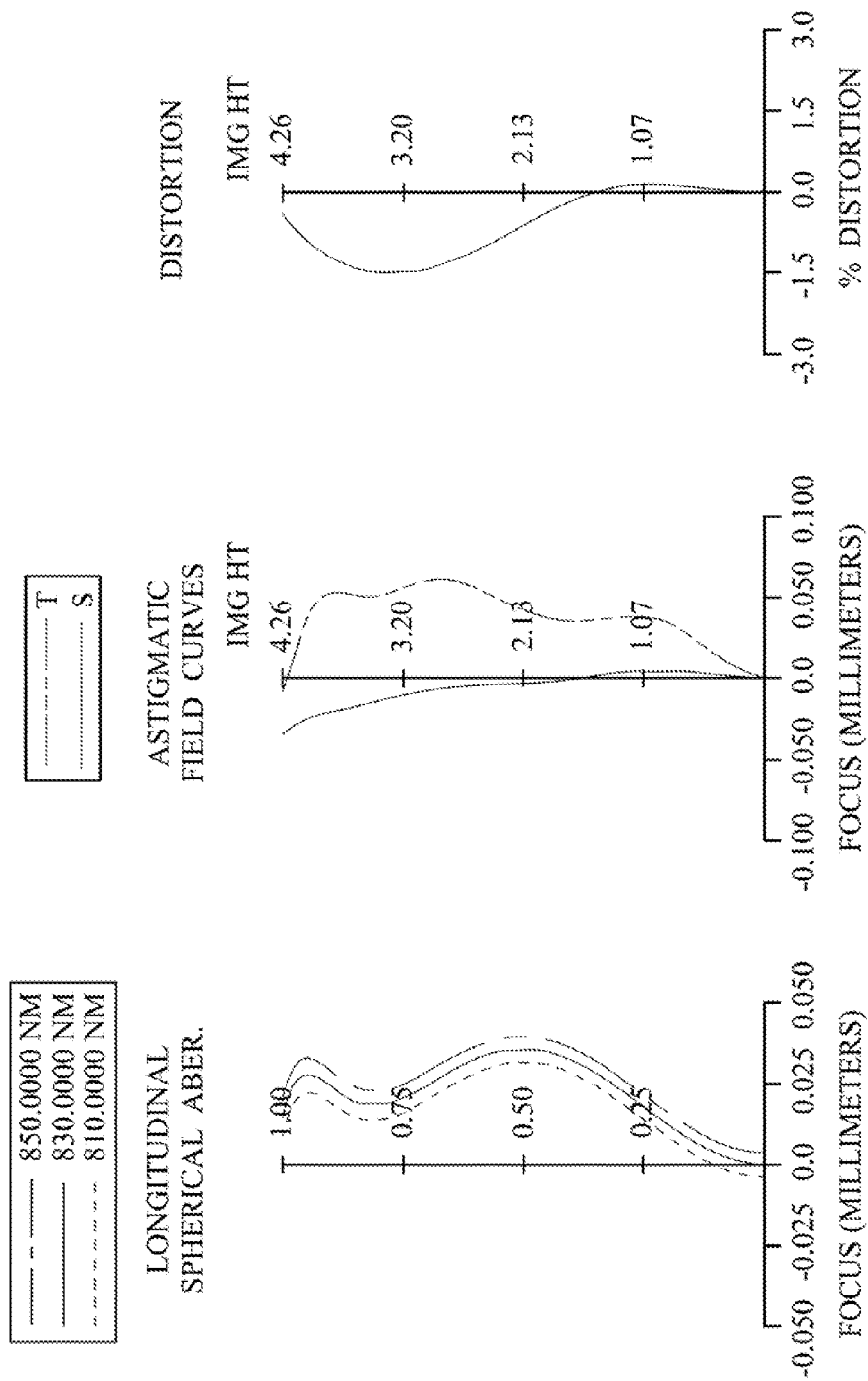
FIG. 20 shows spherical aberration curves, astigmatic field curves and a distortion curve of the image capturing lens assembly according to the 10th embodiment.

FIG. 19 is a schematic view of an image capturing lens assembly according to the 10th embodiment of the present disclosure. FIG. 20 shows spherical aberration curves, astigmatic field curves and a distortion curve of the image capturing lens assembly according to the 10th embodiment. In FIG. 19, the image capturing lens assembly includes, in order from an object side to an image side, a first lens element 1010, an aperture stop 1000, a second lens element 1020, a third lens element 1030, a fourth lens element 1040, a filter 1060, a cover glass 1070 and an image plane 1050.

The first lens element 1010 with negative refractive power has an object-side surface 1011 being convex at a paraxial region and an image-side surface 1012 being concave at a paraxial region. The first lens element 1010 is made of plastic material, such as APEL-5514ML, and has the object-side surface 1011 and the image-side surface 1012 both being aspheric.

The second lens element 1020 with positive refractive power has an object-side surface 1021 being convex at a paraxial region and an image-side surface 1022 being convex at a paraxial region. The second lens element 1020 is made of plastic material, such as APEL-5514ML, and has the object-side surface 1021 and the image-side surface 1022 both being aspheric.

The third lens element 1030 with positive refractive power has an object-side surface 1031 being concave at a paraxial region and an image-side surface 1032 being convex at a paraxial region. The third lens element 1030 is made of plastic material, such as APEL-5514ML, and has the object-side surface 1031 and the image-side surface 1032 both being aspheric. Furthermore, the point on the optical axis projected from a position of a maximal effective diameter of the image-side surface 1032 of the third lens element 1030 is closer to the object side than an axial vertex of the object-side surface 1031 of the third lens element 1030. (Please refer to FIG. 21, and will not provide another figure for the 10th embodiment.)

The fourth lens element 1040 with positive refractive power has an object-side surface 1041 being convex at a paraxial region and being concave at a peripheral region, and has an image-side surface 1042 being concave at a paraxial region and being convex at a peripheral region. The fourth lens element 1040 is made of plastic material, such as APEL-5514ML, and has the object-side surface 1041 and the image-side surface 1042 both being aspheric.

The filter 1060 and the cover glass 1070 are located between the fourth lens element 1040 and the image plane 1050 in order, wherein the filter 1060 and the cover glass 1070 are made of glass material, such as HOYA BSC7, and will not affect the focal length of the image capturing lens assembly.

The image capturing lens assembly according to the 10th embodiment is applied to wavelengths of light between 780 nm and 950 nm.

The detailed optical data of the 10th embodiment are shown in Table 19 and the aspheric surface data are shown in Table 20 below.

TABLE 19

10th Embodiment
f = 5.67 mm, Fno = 2.20, HFOV = 37.0 deg.

| Surface # | | Curvature Radius | | Thickness | Material | | Index | Focal length |
|---|---|---|---|---|---|---|---|---|
| 0 | Object | Plano | | Infinity | | | | |
| 1 | Lens 1 | 6.179 | (ASP) | 2.250 | Plastic | APEL-5514ML | 1.537 | −12.44 |
| 2 | | 2.802 | (ASP) | 0.917 | | | | |
| 3 | Ape. Stop | Plano | | 0.060 | | | | |
| 4 | Lens 2 | 18.935 | (ASP) | 1.031 | Plastic | APEL-5514ML | 1.537 | 5.62 |
| 5 | | −3.518 | (ASP) | 2.056 | | | | |
| 6 | Lens 3 | −2.385 | (ASP) | 1.593 | Plastic | APEL-5514ML | 1.537 | 11.46 |
| 7 | | −2.120 | (ASP) | 0.567 | | | | |
| 8 | Lens 4 | 3.690 | (ASP) | 1.974 | Plastic | APEL-5514ML | 1.537 | 159.81 |
| 9 | | 3.135 | (ASP) | 1.000 | | | | |
| 10 | Filter | Plano | | 0.200 | Glass | HOYA BSC7 | 1.517 | — |
| 11 | | Plano | | 0.500 | | | | |
| 12 | Cover glass | Plano | | 0.550 | Glass | HOYA BSC7 | 1.517 | — |
| 13 | | Plano | | 0.651 | | | | |
| 14 | Image | Plano | | — | | | | |

The image capturing lens assembly is applied to the infrared wavelength.
The focal length and the refractive index are calculated based on a wavelength of 830 nm.

TABLE 20

Aspheric Coefficients

| | Surface # | | | |
|---|---|---|---|---|
| | 1 | 2 | 4 | 5 |
| k = | −3.0837E−01 | 2.0000E+00 | −1.0000E+00 | 1.4424E+00 |
| A4 = | 3.6221E−03 | 1.0720E−02 | −6.0388E−03 | −6.4043E−03 |
| A6 = | −9.0419E−05 | −7.7015E−04 | −1.4092E−03 | −5.6146E−03 |
| A8 = | 2.6216E−05 | 6.3902E−04 | −2.6734E−05 | 3.7359E−03 |
| A10 = | −1.8852E−06 | −1.2149E−05 | −8.5087E−04 | −3.0003E−03 |
| A12 = | | | −8.9112E−06 | 1.1211E−03 |
| A14 = | | | | −2.1252E−04 |

| | Surface # | | | |
|---|---|---|---|---|
| | 6 | 7 | 8 | 9 |
| k = | −4.6003E+00 | −4.5880E−01 | −4.7503E+00 | −4.0907E+00 |
| A4 = | −3.6382E−02 | −1.2388E−03 | −4.9389E−03 | −1.0640E−02 |
| A6 = | 3.8143E−03 | 6.6110E−04 | 6.8171E−04 | 8.4913E−04 |
| A8 = | −8.5470E−04 | 5.9823E−05 | −5.1240E−05 | −4.6970E−05 |
| A10 = | 1.4668E−04 | −1.9928E−05 | 2.0048E−06 | 1.3542E−06 |
| A12 = | | 3.7403E−06 | −4.3714E−08 | −2.0338E−08 |
| A14 = | | 1.9420E−07 | | |

In the optical image system according to the 10th embodiment, the definitions of f, Fno, HFOV, T23, CT2, CT3, R3, R4, R5, R6, R8, f1, f2, f3, f4, SD and TD are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 5.67 | \|(R5 − R6)/(R5 + R6)\| | 0.06 |
| Fno | 2.20 | R8/f | 0.55 |
| HFOV (deg.) | 37.0 | \|f2/f1\| + \|f2/f3\| + \|f2/f4\| | 0.98 |
| T23/CT2 | 1.99 | \|f1/f3\| + \|f1/f4\| | 1.16 |
| T23/CT3 | 1.29 | SD/TD | 0.70 |
| (R3 + R4)/(R3 − R4) | 0.69 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing lens assembly comprising, in order from an object ide to an image side:
    a first lens element with negative refractive power having an object-side surface being convex at a paraxial region and an image-side surface being concave at a paraxial region;
    a second lens element with positive refractive power having an object-side surface being convex at a paraxial region and an image-side surface being convex at a paraxial region;
    a third lens element with positive refractive power having an object-side surface being concave at a paraxial region and an image-side surface being convex at a paraxial region; and
    a fourth lens element with positive refractive power having an object-side surface being convex at a paraxial region, and an image-side surface being concave at a paraxial region and being convex at a peripheral region, wherein the object-side surface and the image-side surface of the fourth lens element are aspheric;
    wherein the image capturing lens assembly has a total of four lens elements, a curvature radius of the object-side surface of the second lens element is R3, a curvature radius of the image-side surface of the second lens element is R4, a focal length of the first lens element is f1, a focal length of the second lens element is f2, a focal length of the third lens element is f3, a focal length of the fourth lens element is f4, and the following relationships are satisfied:

−0.52<(R3+R4)/(R3−R4)<1.0; and

\|f2/f1\|+\|f2/f3\|+\|f2/f4\|<1.1.

2. The image capturing lens assembly of claim 1, further comprising:
    a stop located between the first lens element and the second lens element, wherein an axial distance between the stop and the image-side surface of the fourth lens element is SD, an axial distance between the object-side surface of the first lens element and the image-side surface of the fourth lens element is TD, and the following relationship is satisfied:

0.63<SD/TD<0.83.

3. The image capturing lens assembly of claim 2, wherein a curvature radius of the object-side surface of the third lens element is R5, a curvature radius of the image-side surface of the third lens element is R6, and the following relationship is satisfied:

\|(R5−R6)/(R5+R6)\|<0.1.

4. The image capturing lens assembly of claim 2, wherein an axial distance between the second lens element and the third lens element is T23, a central thickness of the second lens element is CT2, and the following relationship is satisfied:

1.5<T23/CT2<3.5.

5. The image capturing lens assembly of claim 4, wherein the following relationship is satisfied:

\|f1/f3\|+\|f1/f4\|<1.20.

6. The image capturing lens assembly of claim 4, wherein the object-side surface of the fourth lens element is concave at a peripheral region.

7. The image capturing lens assembly of claim 1, wherein the following relationship is satisfied:

\|f2/f1\|+\|f2/f3\|+\|f2/f4\|<0.70.

8. The image capturing lens assembly of claim 1, wherein a point on an optical axis projected from a position of a maximal effective diameter of the image-side surface of the third lens element is closer to the object side than an axial vertex of the object-side surface of the third lens element.

9. The image capturing lens assembly of claim 1, wherein an axial distance between the second lens element and the third lens element is T23, a central thickness of the third lens element is CT3, and the following relationship is satisfied:

1.2<T23/CT3<4.0.

10. The image capturing lens assembly of claim 1, wherein the following relationship is satisfied:

−0.30<(R3+R4)/(R3−R4)<1.0

11. The image capturing lens assembly of claim 1, wherein the image capturing lens assembly is applied to wavelengths of light between 780 nm and 950 nm.

12. The image capturing lens assembly of claim 11, wherein a focal length of the image capturing lens assembly is f, a curvature radius of the age-side surface of the fourth lens element is R8, and the following relationship is satisfied:

0.25<R8/f<0.80.

13. An image capturing lens assembly comprising, in order from an object side to an image side:
    a first lens element with negative refractive power having an object-side surface being convex at a paraxial region and an image-side surface being concave at a paraxial region;
    a second lens element with positive refractive power having an object-side surface being convex at a paraxial region and an image-side surface being convex at a paraxial region;
    a third lens element with positive refractive power having an object-side surface being concave at a paraxial region and an image-side surface being convex at a paraxial region;
    a fourth lens element with positive refractive power having an object-side surface being convex, and an image-side surface being concave at a paraxial region and being convex at a peripheral region, wherein the object-side surface and the image-side surface of the fourth lens element are aspheric;

wherein the image capturing lens assembly has a total of four lens elements, and further comprises a stop located between the first lens element and the second lens element, the image capturing lens assembly is applied to wavelengths of light between 780 nm and 950 nm, a curvature radius of the object-side surface of the second lens element is R3, a curvature radius of the image-side surface of the second lens element is R4, an axial distance between the stop and the image-side surface of the fourth lens element is SD, an axial distance between the object-side surface of the first lens element and the image-side surface of the fourth lens element is TD, and the following relationships are satisfied:

−1.0<(R3+R4)/(R3−R4)<1.0; and 0.63<SD/TD<0.83.

14. The image capturing lens assembly of claim 13, wherein the following relationship is satisfied:

−0.52<(R3+R4)/(R3−R4)<1.0.

15. The image capturing lens assembly of claim 14, wherein a focal length of the first lens element is f1, a focal length of the third lens element is f3, a focal length of the fourth lens element is f4, and the following relationship is satisfied:

|f1/f3|+|f1/f4|<1.20.

16. The image capturing lens assembly of claim 14, wherein an axial distance between the second lens element and the third lens element is T23, a central thickness of the third lens element is CT3, and the following relationship is satisfied:

1.2<T23/CT3<4.0.

17. The image capturing lens assembly of claim 13, wherein a focal length of the first lens element is f1, a focal length of the second lens element is f2, a focal length of the third lens element is f3, a focal length of the fourth lens element is f4, and the following relationship is satisfied:

|f2/f1|+|f2/f3|+|f2/f4|<1.1,

18. The image capturing lens assembly of claim 13, wherein a focal length of the image capturing lens assembly is f, a curvature radius of the nag ide surface of the fourth lens element is R8, and the following relationship is satisfied:

0.25<R8|f<0.80.

19. The image capturing lens assembly of claim 13, wherein the following relationship satisfied:

−0.30<(R3+R4)/(R3−R4)<1.0.

20. The image capturing lens assembly of claim 13, wherein a point on an optical axis projected from a position of a maximal effective diameter of the image-side surface of the third lens element is closer to the object side than an axial vertex of the object-side surface of the third lens element.

21. The image capturing lens assembly of claim 20, wherein the object-side surface of the fourth lens element is concave at a peripheral region.

22. An image capturing lens assembly comprising, in order from an object side to an image side:

a first lens element with negative refractive power having an object-side surface being convex at a paraxial region and an image-side surface being concave at a paraxial region;

a second lens element with positive refractive power having an object-side surface being convex at a paraxial region and an image-side surface being convex at a paraxial region;

a third lens element with positive refractive power having an object-side surface being concave at a paraxial region and an image-side surface being convex at a paraxial region; and a fourth lens element with positive refractive power having an object-side surface being convex at a paraxial region, and an image-side surface being concave at a paraxial region and being convex at a peripheral region, wherein the object-side surface and the mage-side surface of the fourth lens element are aspheric;

wherein the image capturing lens assembly has a total of four lens elements, and further comprises a stop located between the first lens element and the second lens element, wherein an axial distance between the stop and the image-side surface of the fourth lens element is SD, an axial distance between the object-side surface of the first lens element and the image-side surface of the fourth lens element is TD, a curvature radius of the object-side surface of the second lens element is R3, a curvature radius of the image-side surface of the second lens element is R4, and the following relationships are satisfied:

0.6<SD/TD<0.83; and

−0.52<(R3+R4)/(R3−R4)<1.0.

23. The image capturing lens assembly of claim 22, wherein a curvature radius of the object-side surface of the third lens element is R5, a curvature radius of the image-side surface of the third lens element is R6, and the following relationship is satisfied:

|(R5−R6)/(R5−R6)|<0.1.

24. The image capturing lens assembly of claim 22, wherein an axial distance between the second lens element and the third lens element is T23, a central thickness of the second lens element is CT2, and the following relationship is satisfied:

1.5<T23/CT2<3.5

25. The image capturing lens assembly of claim 22, wherein a focal length of the first lens element is f1, a focal length of the third lens element is f3, a focal length of the fourth lens element is f4, and the following relationship is satisfied:

|f1/f3|+f1/f4|<1.20.

26. The image capturing lens assembly of claim 22, wherein the object-side surface of the fourth lens element is concave at a peripheral region.

27. The image capturing lens assembly of claim 22, wherein a point on an optical axis projected from a position of a maximal effective diameter of the image-side surface of the third lens element is closer to the object side than an axial vertex of the object-side surface of the third lens element.

28. The image capturing lens assembly of claim 22, wherein an axial distance between the second lens element and the third lens element is T23, a central thickness of the third lens element is CT3, and the following relationship is satisfied:

$$1.2 < T23/CT3 < 4.0.$$

29. The image capturing lens assembly of claim 22, wherein the following relationship is satisfied:

$$-0.30 < (R3+R4)/(R3-R4) < 1.0.$$

30. The image capturing lens assembly of claim 22, wherein a focal length of the image capturing lens assembly is f, a curvature radius of the image-side surface of the fourth lens element is R8, and the following relationship satisfied:

$$0.25 < R8/f < 0.80.$$

* * * * *